(12) United States Patent
Kim et al.

(10) Patent No.: US 10,593,080 B2
(45) Date of Patent: Mar. 17, 2020

(54) GRAPH GENERATING METHOD AND APPARATUS

(71) Applicant: Daegu Gyeongbuk Institute of Science and Technology, Daegu (KR)

(72) Inventors: Min Soo Kim, Daegu (KR); Himchan Park, Gyeryong-si (KR)

(73) Assignee: Daegu Gyeongbuk Institute of Science and Technology, Daegu (KR)

( * ) Notice: Subject to any disclaimer, the term of this patent is extended or adjusted under 35 U.S.C. 154(b) by 0 days.

(21) Appl. No.: 15/955,914

(22) Filed: Apr. 18, 2018

(65) Prior Publication Data

US 2018/0315229 A1 Nov. 1, 2018

Related U.S. Application Data

(60) Provisional application No. 62/490,677, filed on Apr. 27, 2017.

(30) Foreign Application Priority Data

Mar. 13, 2018 (KR) .................. 10-2018-0029111

(51) Int. Cl.
*G06T 11/20* (2006.01)
*G06F 17/18* (2006.01)
*G06F 17/16* (2006.01)
*G06F 17/10* (2006.01)

(52) U.S. Cl.
CPC ............ *G06T 11/206* (2013.01); *G06F 17/10* (2013.01); *G06F 17/16* (2013.01); *G06F 17/18* (2013.01)

(58) Field of Classification Search
None
See application file for complete search history.

(56) References Cited

U.S. PATENT DOCUMENTS

2011/0313979 A1* 12/2011 Roberts ............... G06F 16/2365
707/690

FOREIGN PATENT DOCUMENTS

| JP | 2009-116844 | 5/2009 |
|---|---|---|
| KR | 10-0939156 | 1/2010 |
| KR | 10-2013-0038903 | 4/2013 |
| KR | 10-1717230 | 3/2017 |

OTHER PUBLICATIONS

Seshadhri et al.; "An In-Depth Study of Stochastic Kronecker Graphs;" 2011 11th IEEE International Conference on Data Mining, Dec. 11, 2011; Vancouver, Canada ; Published by IEEE, New York, NY, USA (Year: 2011).*

(Continued)

*Primary Examiner* — Edward Martello

(57) ABSTRACT

Disclosed is a graph generating method and apparatus, the graph generating apparatus that may recognize one source vertex among a plurality of vertices, obtain the target number of at least one edge to generate from the source vertex, among the total target number of edges to generate between the vertices, obtain a recursive vector to be used repeatedly to generate the at least one edge, in a scope in which an existence of an edge for the source vertex needs to be verified, and generate the at least one edge between the source vertex and at least one destination vertex based on the target number and the recursive vector.

26 Claims, 17 Drawing Sheets

(56) References Cited

OTHER PUBLICATIONS

Maass et al.; "MOSAIC: Processing a Trillion-Edge Graph on a Single Machine," EuroSys '17, Apr. 23-26, 2017, Belgrade, Serbia; Published by ACM, New York, NY, USA (Year: 2017).*

Chakrabarti et al. "R-MAT: A Recursive Model for Graph Mining", Proceedings of the 2004 SIAM International Conference on Data Mining, Lake Bueno Vista, Florida, USA, Apr. 22-24, 2004, 5 P., Apr. 22, 2004.

Leskovec et al. "Kronecker Graphs: An Approach to Modeling Networks", Journal of Machine Learning Research, 11: 985-1042, Feb. 2010.

\* cited by examiner

FIG. 3A

| u \ v | 0 | 1 |
|---|---|---|
| 0 | $\alpha = .5$ | $\beta = .2$ |
| 1 | $\gamma = .2$ | $\delta = .1$ |

FIG. 3B

| u \ v | 0 | 1 | 2 | 3 | 4 | 5 | 6 | 7 |
|---|---|---|---|---|---|---|---|---|
| 0 | .125 | .05 | .05 | .02 | .05 | .02 | .02 | .008 |
| 1 | .05 | .025 | .02 | .01 | .02 | .01 | .008 | .004 |
| 2 | .05 | .02 | .025 | .01 | .02 | .008 | .01 | .004 |
| 3 | .02 | .01 | .01 | .005 | .008 | .004 | .004 | .002 |
| 4 | .05 | .02 | .02 | .008 | .025 | .01 | .01 | .004 |
| 5 | .02 | .01 | .008 | .004 | .01 | .005 | .004 | .002 |
| 6 | .02 | .008 | .01 | .004 | .01 | .004 | .005 | .002 |
| 7 | .008 | .004 | .004 | .002 | .004 | .002 | .002 | .001 |

FIG. 7A

Node types

| vertex type | constraint |
|---|---|
| researcher | 50% |
| paper | 30% |
| conference | 10% |
| city | 10% |

Edge predicates

| edge predicate | constraint |
|---|---|
| author | 60% |
| publishedIn | 30% |
| heldIn | 10% |

In - and out - degree distributions

| Source type $\overrightarrow{predicate}$ target type | $D_{out}$ | $D_{in}$ |
|---|---|---|
| researcher $\overrightarrow{author}$ paper | Zipfian | Gaussian |
| paper $\overrightarrow{publishedIn}$ conference | Unif. (1,1) | Gaussian |
| conference $\overrightarrow{heldIn}$ city | Unif. (1,1) | Zipfian |

FIG. 7B

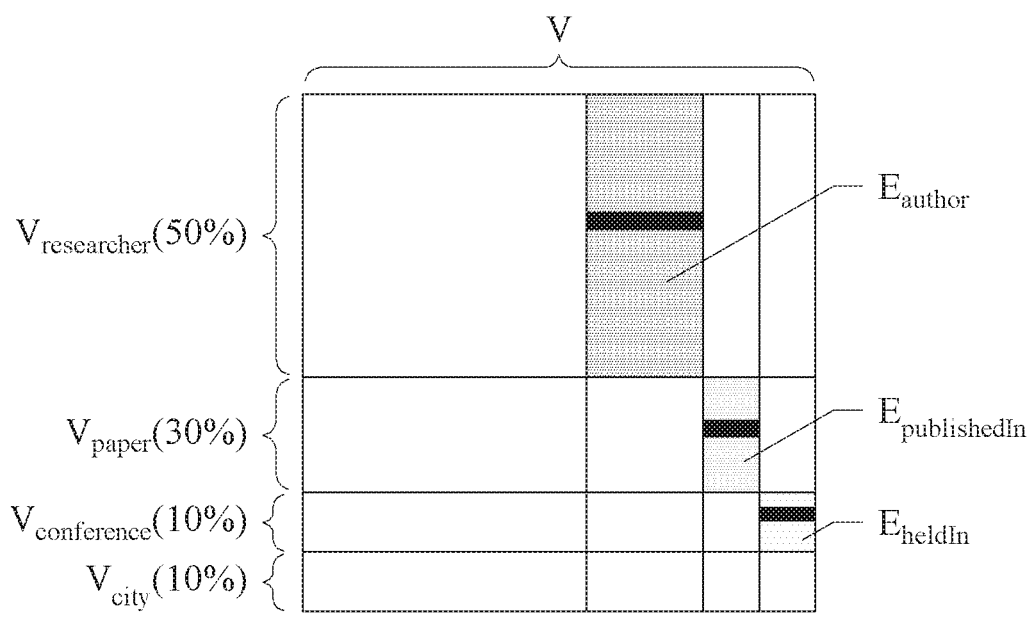

GRAPH GENERATING METHOD AND APPARATUS

RELATED APPLICATIONS

This application claims the benefit of priority under 35 USC § 119(e) of U.S. Provisional Patent Application No. 62/490,677 filed on Apr. 27, 2017, and Korean Patent Application No. 10-2018-0029111 filed on Mar. 13, 2018, the contents of which are incorporated herein by reference in their entirety.

FIELD AND BACKGROUND OF THE INVENTION

One or more example embodiments relate to a method and apparatus for generating a graph.

Graphs are widely used to model real-world objects in many domains such as social networks, web, business intelligence, biology, and neuroscience, due to their simplicity and generality. As many applications such as graph-based distributed on-line transaction processing (OLTP) query processing, the Internet of Thing (IoT), and the human connectome encounter exponential growth in graph sizes, both fast and scalable graph processing methods and synthetic graph generation methods have become more important than ever before. There are two strong motivations for studying a fast and scalable graph generator: (1) a lack of large-scale realistic graphs for evaluating the performance of graph processing methods; and (2) a lack of low-level core techniques that may be used for generating a benchmark database for rich graph model.

For the first motivation, a number of graph processing systems that may process a graph of one trillion edges have already been developed. All of the graph processing systems have used synthetic graphs for evaluating their performance since sharing and utilizing large-scale real-world graphs is very limited due to their being proprietary, or being practically impossible to collect. However, most trillion-scale synthetic graphs used so far are unrealistic synthetic graphs that have a huge number of repeated edges and do not follow the power-law degree distribution, which are considered as important properties of "realistic" graphs. Thus, a scalable realistic synthetic graph generator is critical for more accurate evaluation of graph processing methods.

The existing synthetic graph generators may not generate a graph of trillion edges by using a cluster of commodity machines, or require a supercomputer for generating graphs. There have been proposed a number of models or methods to generate realistic synthetic graphs, and recursive MATrix (RMAT) and Kronecker are most commonly used among the models or methods. RMAT is based on a recursive matrix model that recursively selects a quadrant on an adjacency matrix to generate an edge and repeats the same procedure until a total of |E| edges are generated for a graph G=(V, E). Kronecker has two models for graph generation: stochastic Kronecker graph (SKG) and deterministic Kronecker graph (DKG). SKG is a generalized model of RMAT in terms of the number of probability parameters.

Hereinafter, RMAT and Kronecker will be described.

"RMAT"

RMAT stands for recursive MATrix (RMAT) graph generator and may be the most commonly used model to generate realistic synthetic scale-free graphs. The basic idea behind RMAT is recursive quadrant selection on an adjacency matrix for edge generation, and RMAT repeats such edge generation until a whole graph is generated. Conceptually, RMAT partitions an adjacency matrix into four quadrants, which have probability parameters $\alpha$, $\beta$, $\gamma$ and $\delta$, as in FIG. 1A. A higher parameter value indicates a higher probability for the corresponding quadrant to be selected, and the sum of four parameters should be 1.0. For a graph G=(V, E), V denotes a vertex, E denotes an edge, and the size of the adjacency matrix is |V|×|V|, where a row indicates a source vertex and a column indicates a destination vertex. Each quadrant is recursively partitioned into four sub-quadrants of the same probability parameters $\alpha$, $\beta$, $\gamma$ and $\delta$ until the size of a sub-quadrant becomes 1×1. Therefore, the number of recursive selection operations required for generating an edge is log |V|. FIG. 1B shows an example of generation of an edge in RMAT, where the operations of recursive guardant selection are $\beta \to \delta \to \gamma \to \beta$ (|V|=16). When the recursive quadrant selection reaches the 1×1 cell of the adjacent matrix, for example, (x, y) cell, RMAT appends an edge (x, y) to the resulting graph.

"Kronecker"

SKG stands for stochastic Kronecker graph generator and is a generalized model of RMAT. While RMAT considers only 2×2 probability parameters, SKG considers n×n probability parameters. That is RMAT is a special case of SKG (n=2). Both RMAT and SKG are similar to each other in terms of using probability matrix, but are dissimilar to each other in terms of the stochastic process. While RMAT generates an edge via a series of recursive operations in a dynamic manner, SKG generates an edge in a static manner. In detail, SKG checks, for every cell of the adjacency matrix, whether the corresponding edge is generated or not with respect to the probability of the cell. FIG. 1C shows an example of generation of an edge in SKG, where a black cell has the probability of $\beta \times \delta \times \gamma \times \beta$ for generation. When a randomly generated value for the cell is within the probability, the corresponding edge is generated.

The entire probability matrix of |V|×|V| of SKG may be presented using the Kronecker product. The Kronecker product is an operator to calculate an outer product between given two arbitrary-size matrices.

Definition 1. Kronecker Product:

Given two matrices A and B, where A is of size n×m, and B is of size p×q, the Kronecker product between A and B is defined as $$\begin{bmatrix} a_{1,1}B & \cdots & a_{1,m}B \\ \vdots & \ddots & \vdots \\ a_{n,1}B & \cdots & a_{n,m}B \end{bmatrix}$$

and expressed by Equation 1 in more detail.

$$A \otimes B = \begin{bmatrix} a_{1,1}b_{1,1} & \cdots & a_{1,1}b_{1,q} & & a_{1,m}b_{1,1} & \cdots & a_{1,m}b_{1,q} \\ \vdots & \ddots & \vdots & \cdots & \vdots & \ddots & \vdots \\ a_{1,1}b_{p,1} & \cdots & a_{1,1}b_{p,q} & & a_{1,m}b_{p,1} & \cdots & a_{1,m}b_{p,q} \\ & \vdots & & \ddots & & \vdots & \\ a_{n,1}b_{1,1} & \cdots & a_{n,1}b_{1,q} & & a_{n,m}b_{1,1} & \cdots & a_{n,m}b_{1,q} \\ \vdots & \ddots & \vdots & \cdots & \vdots & \ddots & \vdots \\ a_{n,1}b_{p,1} & \cdots & a_{n,1}b_{p,q} & & a_{n,m}b_{p,1} & \cdots & a_{n,m}b_{p,q} \end{bmatrix}$$

[Equation 1]

By using Definition 1, the probability matrix of SKG $\mathbb{K}$ may be presented as Equation 2.

$$\mathbb{K} = K \otimes K \otimes K \ldots \otimes K = K^{\otimes \log_n |V|}$$  [Equation 2]

In Equation 2, K is a given seed probability n×n matrix.

Although both RMAT and Kronecker (that is, SKG) are effective for generating synthetic graphs that are realistic, RMAT and Kronecker are not very efficient for generating large-scale graphs in terms of space and time complexities. RMAT has the space complexity of $O(|E|)$, while Kronecker has the time complexity of $O(|V|^2)$. RMAT has a relatively high space complexity, and Kronecker has a relatively high time complexity. Thus, RMAT tends to have a limit on the size of a graph to generate due to its high memory requirement, and Kronecker tends to have a limit due to its high computational overhead. There is a benchmark called Graph500. Graph500 generates a trillion-scale graph and runs a simple query on it for measuring the performance of supercomputers. This benchmark uses the SKG model of Kronecker for graph generation. A number of supercomputers may generate a trillion-scale graph through the benchmark. However, the benchmark uses a huge amount of computing resources, typically several thousand server computers connected via a high speed network, for example, Infiniband. To most researchers, it may be practically impossible to use such equipment for graph generation. Therefore, it is a challenging problem to generate a trillion-scale synthetic graph efficiently only using a small amount of computing resource.

For the second motivation, there have been a lot of efforts to automatically generate a benchmark database for semantically rich graph models similar to the transaction processing performance (TPC) benchmark for the relational model. With the proliferation of linked data in the real world, managing graph-structured linked data becomes more and more important in many domains. There have been proposed a number of performance benchmarks for linked data management systems. One of representative methods, gMark may generate a graph having various properties such as multiple node types and edge predicates. Linked Data Benchmark Council (LDBC) Social Network Benchmark (SNB) Datagen is another representative method in social network benchmark.

These methods have focused on rich semantics of a graph rather than the size of the graph so far. As a result, the sizes of resulting databases tend to be very small. However, both rich semantics and scalability are important for an ideal benchmark. Thus, it is another challenging problem to develop scalability techniques that may be used for generating such a benchmark.

SUMMARY OF THE INVENTION

An aspect provides a graph generating method that may generate a graph efficiently in terms of space and time complexities.

Another aspect also provides a graph generating method that may generate massive graphs in a short time only using a small amount of memory.

Still another aspect also provides a graph generating method that may improve a scalability of graph generation.

According to an aspect, there is provided a graph generating method including recognizing one source vertex among a plurality of vertices, obtaining the target number of at least one edge to generate from the source vertex, among the total target number of edges to generate between the vertices, obtaining a recursive vector to be used repeatedly to generate the at least one edge, in a scope in which an existence of an edge for the source vertex needs to be verified, and generating the at least one edge between the source vertex and at least one destination vertex based on the target number and the recursive vector.

The obtaining of the target number may include calculating a probability of generating an edge connected from the source vertex based on predefined probability parameters, and determining the target number of at least one edge to generate from the source vertex based on a stochastic distribution following the probability and the total target number.

The probability may be calculated based on the number of 1 bits in a binary string corresponding to the source vertex and the probability parameters of which the sum is 1.

The calculating of the probability may include calculating the probability of generating an edge connected from the source vertex using $P_{u\rightarrow} = (\alpha+\beta)^{Bits(\sim u)} \cdot (\gamma+\delta)^{Bits(u)}$, where $P_{u\rightarrow}$ denotes the probability, u denotes the binary string corresponding to the source vertex, ~ denotes a bitwise NOT operator, Bits(x) denotes a local bit operator which returns the number of 1 bits in a binary string x, and $\alpha$, $\beta$, $\gamma$ and $\delta$ denote the probability parameters of which the sum is 1.

The determining of the target number may include generating a random value following a normal distribution $N(np, np(1-p))$, where n denotes the total target number, and p denotes the probability.

The obtaining of the recursive vector may include calculating a probability of generating an edge connected from the source vertex based on predefined probability parameters, and generating a recursive vector having values of elements corresponding to indices based on the probability, the probability parameters, and the number of the vertices.

The generating of the recursive vector may include generating the values of the elements of the recursive vector for each of indices satisfying a predefined condition, using $$RecVec[x] = \left(\frac{\alpha}{\alpha+\beta}\right)^{\log|V|-x-Bits(u \gg x)} \cdot \left(\frac{\gamma}{\gamma+\delta}\right)^{Bits(u \gg x)} \cdot P_{u\rightarrow},$$

where x denotes an index, RecVec[x] denotes a value of an element of the recursive vector corresponding to x, $\alpha$, $\beta$, $\gamma$ and $\delta$ denote the probability parameters of which the sum is 1, $|V|$ denotes the number of the vertices, $\gg$ denotes a logical right shift operator, $Bits(u \gg x)$ denotes a logical bit operator which returns the number of 1 bits in a binary string $u \gg x$, and $P_{u\rightarrow}$ denotes the probability.

The predefined condition may be $x \leq \log|V|$.

The length of the recursive vector may be $\log|V|+1$, where $|V|$ denotes the number of the vertices.

The recursive vector may be stored in a central processing unit (CPU) cache.

The scope may be determined based on the number of the vertices.

The generating may include determining the at least one destination vertex by repeatedly performing a binary search with respect to the recursive vector and generating at least one edge corresponding to the determined destination vertex, until edges corresponding to the target number are generated.

The generating may include generating a random value based on the recursive vector and the number of the vertices, determining a destination vertex corresponding to the random value based on the recursive vector, and generating an edge between the source vertex and the destination vertex.

The generating of the edge may further include comparing the number of at least one pre-generated edge and the target number, and generating a second edge between the source vertex and a second destination vertex based on a result of the comparing.

The generating of the random value may include generating the random value based on a value of an element of the recursive vector corresponding to the number of the vertices.

The random value may be a value between 0 and RecVec[log|V|], where |V| denotes the number of the vertices, and RecVec[log|V|] denotes the value of the element of the recursive vector corresponding to log|V|.

The determining of the destination vertex may include determining at least one index satisfying a predefined condition for the recursive vector and the random value, and determining the destination vertex based on the determined at least one index.

The determining of the destination vertex may include determining a first index satisfying a predefined condition for the recursive vector and the random value, calculating a symmetry ratio for the first index based on the first index and the recursive vector, generating a second random value based on the random value, the recursive vector, and the symmetry ratio, determining a second index satisfying the predefined condition for the recursive vector and the second random value, and determining the destination vertex based on at least one pre-generated index, in a case in which there is no index satisfying the predefined condition for the recursive vector and a third random value.

The determining of the destination vertex may include determining an index k satisfying RecVec[k]≤x<RecVec[k+1], calculating a symmetry ratio $$\sigma = \frac{RecVec[k+1] - RecVec[k]}{RecVec[k]}$$

for k, generating a second random value $$x' = \frac{x - RecVec[k]}{\sigma},$$

determining an index k' satisfying RecVec[k']≤x'<RecVec[k'+1], and determining the destination vertex to be $2^k + 2^{k'}$ in a case in which there is no index satisfying a predetermined condition for the recursive vector and a third random value, where x denotes the random value, and RecVec[k] denotes a value of an element of the recursive vector corresponding to k.

According to another aspect, there is also provided a graph generating method including assigning vertices to be processed by a plurality of calculation nodes to the calculation nodes based on the target numbers of edges to generate from a plurality of vertices, generating, by a calculation node, a graph in a unit of one source vertex among the vertices, based on a recursive vector to be used repeatedly to generate at least one edge, generating, by the calculation node, a graph in a unit of a second source vertex in a case in which a vertex range to be processed by the calculation node exists, and storing the graph generated in the unit of the source vertex in a case in which the vertex range to be processed by the calculation node does not exist.

The assigning may include determining the target numbers of the vertices based on predefined probability parameters and the total target number of edges to generate between the vertices, partitioning the vertices for the calculation nodes based on the total target number and the number of the calculation nodes, and generating vertex ranges by combining the partitioned vertices, repartitioning the generated vertex ranges for the calculation nodes based on the total target number and the number of the calculation nodes, and assigning the vertices to be processed by the calculation nodes to the calculation nodes based on the vertex ranges repartitioned for the calculation nodes.

Graphs corresponding to the vertices may be processed in parallel by the calculation nodes for the assigned vertices.

The generating of the graph in the unit of the source vertex may include generating at least one edge between the source vertex and at least one destination vertex in a scope in which an existence of an edge for the source vertex needs to be verified.

The graph generating method may further include temporarily storing the graph generated in the unit of the source vertex in a buffer of the calculation node, and asynchronously storing the graph stored in the buffer to an auxiliary memory of the calculation node based on an amount of data stored in the buffer.

According to still another aspect, there is also provided an apparatus that may be controlled by a computer program embodied on a non-transitory computer readable medium, the computer program being configured to control a processor to perform any one of the methods described above.

According to yet another aspect, there is also provided a graph generating apparatus including a controller configured to assign vertices to be processed by a plurality of calculation nodes to the calculation nodes based on the target numbers of edges to generate from a plurality of vertices, and a calculation node configured to generate a graph in a unit of one source vertex among the vertices, based on a recursive vector to be used repeatedly to generate at least one edge, generate a graph in a unit of a second source vertex in a case in which a vertex range to be processed exists, and store the graph generated in the unit of the source vertex in a case in which the vertex range to be processed does not exist.

Additional aspects of example embodiments will be set forth in part in the description which follows and, in part, will be apparent from the description, or may be learned by practice of the disclosure.

BRIEF DESCRIPTION OF THE SEVERAL VIEWS OF THE DRAWINGS

These and/or other aspects, features, and advantages of the invention will become apparent and more readily appreciated from the following description of example embodiments, taken in conjunction with the accompanying drawings of which:

FIGS. 3A and 3B illustrate matrices related to graph generation;

FIGS. 7A and 7B illustrate an example of graph generation;

DESCRIPTION OF SPECIFIC EMBODIMENTS OF THE INVENTION

Figure 1A:
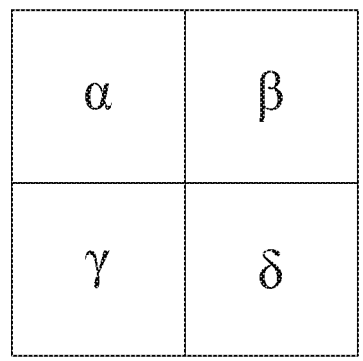
FIGS. 1A, 1B and 1C illustrate existing graph generating methods.
Figure 1B:
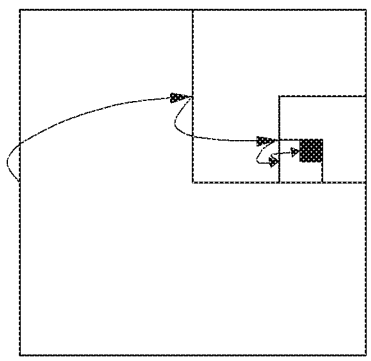
Figure 1C:
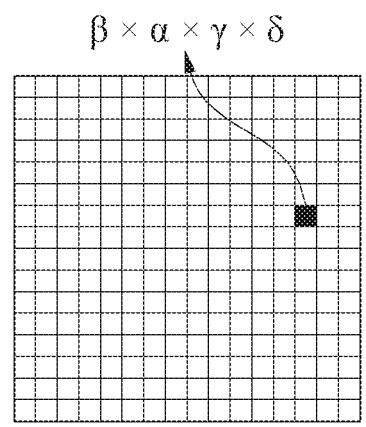

The following structural or functional descriptions are exemplary to merely describe the exemplary embodiments, and the scope of the exemplary embodiments is not limited to the descriptions provided in the present specification. Various changes and modifications can be made thereto by those of ordinary skill in the art.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It will be understood that when a component is referred to as being "connected to" another component, the component can be directly connected or coupled to the other component or intervening components may be present.

As used herein, the singular forms are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching with contextual meanings in the related art and are not to be construed as an ideal or excessively formal meaning unless otherwise defined herein.

Hereinafter, the example embodiments will be described in detail with reference to the accompanying drawings, wherein like drawing reference numerals are used for like elements.

As many applications encounter exponential growth in graph sizes, a fast and scalable graph generator has become more important than ever before due to a lack of large-scale realistic graphs for evaluating the performance of graph processing methods. Although there have been proposed a number of methods to generate synthetic graphs, the methods are not very efficient in terms of space and time complexities, and so, may not generate even trillion-scale graphs using a moderate size cluster of commodity machines.

Here, an efficient and scalable disk-based graph generation technique, TrillionG is proposed. According to an embodiment, a graph generating apparatus may generate a graph using TrillionG. The graph generating apparatus is an apparatus for generating a graph, and may be implemented using, for example, software modules, hardware modules, or a combination thereof.

A graph generating apparatus using TrillionG may generate massive graphs in a short time only using a small amount of memory. A new graph generation model called a recursive vector model is proposed. The graph generating apparatus may solve the space and time complexity problems using the recursive vector model. The recursive vector model may be extended so as to generate a semantically richer graph database. The graph generating apparatus using TrillionG may achieve such speed-up due to three key ideas of the recursive vector model: (1) reusing a pre-computed recursive vector; (2) reducing the number of quadrant selections; and (3) reducing the number of random value generations.

TrillionG may follow a stochastic approach for edge generation, and so, the resulting synthetic graph may be realistic with respect to a degree distribution. An extended recursive vector (ERV) model is proposed, and the graph generating apparatus may generate a rich graph using the ERV model.

The graph generating apparatus may generate a graph in a unit of one vertex using a recursive vector. If only an edge generated in a scope of one vertex can be stored in a memory, the graph generating apparatus may generate a whole graph, and thus may generate a trillion-scale synthetic graph. The graph generating apparatus may utilize a central processing unit (CPU) cache which is very faster than the memory for a process of synthesizing the graph using the recursive vector, and thus may reduce a very small recursive vector to be loaded on the CPU cache while generating the graph in a unit of one vertex, thereby increasing the speed of graph generation.

Hereinafter, an example of applying a graph generation model to a scope-based model and analyzing a complexity of the model will be described. A recursive vector model, a TrillionG system based on the recursive vector model, and an extension of the recursive vector model for rich graph generation according to an embodiment will be described.

"Scope-Based Generation Model"

A model for synthetic graph generation is proposed. Recursive MATrix (RMAT) has a high space complexity, whereas Kronecker has a high time complexity. A difference in computational overhead is mainly due to a difference in scope of edge generation. A scope is a range in which an existence of an edge needs to be verified. When generating an edge, RMAT considers a whole adjacency matrix as a scope for generating non-repeated edges, and thus the number of generations for a graph is |E|. On the contrary, Kronecker considers only an individual cell of an adjacency matrix as a scope, and thus the number of generations for a graph is |V|×|V|. |E| denotes the number of edges, and |V| denotes the number of vertices. Hereafter, the former RMAT technique is referred to as whole edges scope (WES), and the latter Kronecker technique is referred to as an edge scope (AES).

Figure 2A:
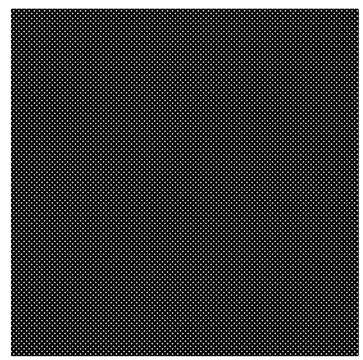
FIGS. 2A, 2B and 2C illustrate scopes related to graph generation.
Figure 2B:
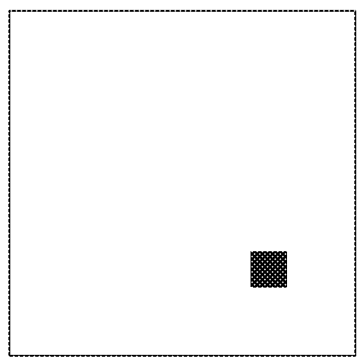
Figure 2C:
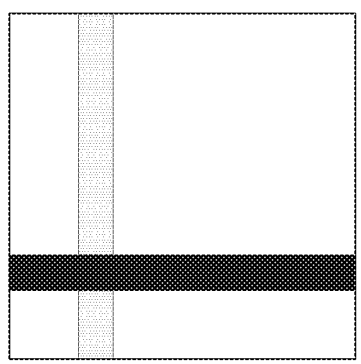

The graph generating apparatus may utilize a recursive vertex model. The recursive vertex model may consider a row (or a column) of an adjacency matrix as a scope. The recursive vertex model technique is referred to as a vertex scope (AVS). FIGS. 2A, 2B and 2C show scopes of generation models, WES, AES and AVS, respectively.

The models of WES, AES and AVS, called the scope-based generation models, will be described. Each of the models may generate a synthetic graph in two operations: scope generation and edge generation. Algorithm 1 shows the scope generation operation.

| Algorithm 1 Scope-based Generation Model |
| --- |
| Input: \|V\|, /*number of vertices*/ <br> N × M /*size of a scope*/ |
| 1: $\quad rangeSetI \leftarrow \left\{ [kN, (k+1)N-1] \mid 0 \le k < \frac{\|V\|}{N} \right\}$ |
| 2: $\quad rangeSetJ \leftarrow \left\{ [lM, (l+1)M-1] \mid 0 \le l < \frac{\|V\|}{M} \right\}$ |
| 3: $\quad$ grid ← {$\mathbb{S}$(I,J)\|I ∈ rangeSetI, J ∈ rangeSetJ} |
| 4: $\quad$ parallel for each $\mathbb{S}$(I,J) in grid do |
| 5: $\quad\quad$ ScopeGeneration($\mathbb{S}$(I,J)) |

With a given size of a scope N×M, Lines 1-2 generate a set of ranges for scopes. |V| may be divided by either of two integers, N and M, without a remainder. rangeSetI is a set of ranges along a vertical axis, and rangeSetJ is a set of ranges along a horizontal axis. Line 3 generates a grid of scopes according to the two sets of ranges, and Line 5 calls a ScopeGeneration function for each scope in parallel. In RMAT, N=M=|V|, and in Kronecker, N=M=1.

Algorithm 2 shows the ScopeGeneration function which generates all edges within a given scope.

| Algorithm 2 Scope Generation |
| --- |
| Input: $\mathbb{S}$(I, J) /* scope for edge generation */ |
| 1: edgeSet ← ∅ |
| 2: while count(edgeSet) ≤ \|$\mathbb{S}$(I, J)\| do |
| 3: $\quad$ newEdge ← EdgeGeneration($\mathbb{S}$(I, J)) |
| 4: $\quad$ edgeSet ← edgeSet ∪ {newEdge} |
| 5: Store(edgeSet) |

An EdgeGeneration function is called on the given scope until |$\mathbb{S}$(I, J)| edges are generated. Here, |·| is a special function that calculates the proper number of edges within a given scope in a stochastic manner. In RMAT, returns |$\mathbb{S}$(I, J)| since there is only one scope. In Kronecker, 0 or 1 is returned depending on a probability of the corresponding scope (cell). A count(edgeSet) function simply returns the number of elements in edgeSet. Finally, Algorithm 2 stores a set of edges in a main memory to a secondary storage (Line 5). It is assumed that edgeSet for a scope resides in the main memory during scope generation, in order to check duplication of an edge and avoid repeat edges during set union (Line 4).

According to Algorithm 2, the WES approach has a limit on parallel processing since the WES approach has only a single scope. The scope-based generation model assumes that each scope is processed independently. If the ScopeGeneration function is concurrently executed on the same scope for better performance in the WES approach, duplicates of the same edge across different memory spaces on the same scope need to be resolved.

"Complexities of Models"

The space and time complexities for the scope-based generation model will be described. In terms of the time complexity, the cost of generating an entire graph, $T_{graph}$, may be calculated as in Equation 3.

$$T_{graph} = \sum_{\mathbb{S} \in grid} T_{scope}(\mathbb{S}) \qquad [\text{Equation 3}]$$

$T_{scope}$ is the cost of the ScopeGeneration function. $T_{scope}$ may be calculated as in Equation 4.

$$T_{scope}(\mathbb{S}) = |\mathbb{S}| \times T_{edge} \qquad [\text{Equation 4}]$$

$T_{edge}$ is the cost of the EdgeGeneration function.

In the WES approach, |$\mathbb{S}$| is equal to |E|, and Tedge is O(log |V|) due to recursive quadrant selection. Therefore, the time complexity of WES becomes O(|E| log |V|). In the AES approach, the number of scopes is |V|², |$\mathbb{S}$|=1, and $T_{edge}$ is O(1). Therefore, the original time complexity of AES becomes O(|V|²). Since AES may be easily parallelized, the time complexity thereof in a distributed system having P cores may become $$O\left(\frac{|V|^2}{P}\right).$$

In terms of the space complexity, an amount of memory required in a machine becomes equal to the size of the scope, that is, |$\mathbb{S}$(I, J)|, to check duplication of an edge. The WES approach requires a space of O(|E|), and the AES approach requires a space of O(1). That is, WES may fail to generate a graph if the whole set of edges may not fit in the main memory.

In general, both real graphs and scale-free synthetic graphs are very sparse. These graphs have a much smaller number of edges |E| compared with the number of cells of the adjacency matrix |V|². Therefore, the original AES approach is much slower than the WES approach in most cases. In order to overcome this problem, FastKronecker has been proposed, which is embedded in Stanford network analysis project (SNAP). Although the name is FastKronecker, FastKronecker generates a graph in an RMAT-like manner. FastKronecker performs a recursive region selection using a given n×n seed matrix for generating an edge. The number of recursions is $\log_n |V|$. FastKronecker performs such a series of selections |E| times for a graph generation. During graph generation, FastKronecker needs to keep all edges in a memory to eliminate duplicates. When n=2, FastKronecker becomes equal to RMAT of the WES approach. Thus, the time and space complexities of FastKronecker become O(|E| log |V|) and O(|E|), respectively.

"Merge-Based Approach"

A variation of the WES approach, called WES/p, will be described. WES/p executes a ScopeGeneration function in parallel and then merges edges shuffled in parallel. WES/p is a simple parallel version of WES. The basic idea of WES/p is that WES/p performs the same scope generation of WES in parallel, and then, after the generation, eliminates duplicated edges by shuffling and merging all generated edges. Algorithm 3 presents the pseudo code of WES/p.

| Algorithm 3 Merge-based Approach (WES/p) |
| --- |
| Input: $\mathbb{S}$(V,V), /*whole adjacency matrix*/ P/*number of cores*/ |
| 1: parallel for p in [0, P − 1] do |
| 2: edgeSet ← ∅ |
| 3: while count(edgeSet) ≤ $\frac{|E|}{P} \cdot (1 + \epsilon)$ do |
| 4: newEdge ← EdgeGeneration($\mathbb{S}$(V,V)) |
| 5: edgeSet ← edgeSet ∪ {newEdge} |
| 6: Store(edgeSet) |
| 7: Shuffle(edgeSet)/*shuffle partial edgeSet*/ |
| 8: parallel for p in [0, P − 1] do |
| 9: Merge(edgeSet')/*eliminate duplicates*/ |

Lines 2-6 are very similar to Algorithm 2, except the size of a scope. Since Lines 2-6 are executed on the same scope, the size of the scope needs to be set to $$\frac{|E|}{P} \cdot (1 + \epsilon)$$

instead of $$\frac{|E|}{P}$$

with considering duplicate elimination ($\epsilon > 0$). It is difficult to know an exact $\epsilon$ value in advance, and the proper $\epsilon$ value tends to decrease as |E| increases. Line 7 shuffles local edgeSet across a network. Lines 8-9 merge incoming edgeSet' while eliminating duplicates, which stops when the number of edges becomes $$\frac{|E|}{P}.$$

The WES/p approach may decrease the time complexity by up to P times compared with the original WES approach.

Let WES/p-mem be an in-memory version of WES/p and WES/p-disk be a disk-based version of WES/p. The major difference between both versions is the way of duplicate elimination. WES/p-mem uses a memory, while WES/p-disk uses an external sort. Thus, WES/p-disk may generate much large graphs than WES/p-mem. In the case of WES/p-mem, P times more machines are needed for generating a P times bigger graph. Thus, WES/p-mem is still not a good solution to generate a several orders of magnitude bigger synthetic graph.

Furthermore, there are two additional overheads in WES/p: (1) shuffling overhead $T_{shuffle}$ and (2) merging overhead $T_{merge}$. $T_{shuffle}$ may be a transfer time of the whole set of edges among machines, and $T_{merge}$ may be at least O(|edgeSet'|log|edgeSet'|), which entails an external sort. As P increases, the sizes of edgeSet' become more skewed in general, which may further degrade the overall performance.

"AVS Approach"

Both WES and AES have some issues in complexities due to either too coarse or too fine granularity of their scopes. A vertex scope (AVS) approach is proposed. AVS has scopes of "medium" granularity. In FIG. 2C, a black area indicates AVS based on out-edge, shortly, AVS-O, and a gray area indicates AVS based on in-edge, shortly, AVS-I. In the AVS approach, a scope is set to either 1×|V|(AVS-O) or |V|×1 (AVS-I). The size of a grid, that is, the number of scopes, becomes |V|. As a result, the area of a scope is much smaller than that of WES, and at the same time, the number of scopes is also much smaller than that of AES.

The complexities of the AVS approach are analyzed. A scope of AVS-O is denoted as $\mathbb{S}$(i, V), and that of AVS-I is denoted as $\mathbb{S}$(V, i)($\forall i \in V$). The size of a scope of AVS-O is denoted as $|\mathbb{S}(i, V)|=d_i^+$, and that of AVS-I is denoted as $|\mathbb{S}(V, i)|=d_i^-$. Here, $d_i^+$ is an out-degree of a vertex i, and $d_i^-$ is an in-degree of the vertex i. Then, the time complexities of AVS are expressed as in Equations 5 through 7.

$$T^+_{graphAVS} = \sum_{i \in V} \{d_i^+ \times T_{edge}\} \quad \text{[Equation 5]}$$

$$T^-_{graphAVS} = \sum_{i \in V} \{d_i^- \times T_{edge}\} \quad \text{[Equation 6]}$$

$$T_{graphAVS} = \sum_{i \in V} d_i \times \log|V| \leq |E|\log|V| \quad \text{[Equation 7]}$$

In Equation 7, the recursive vector model generates an edge recursively in a range of [0, |V|−1]. $T_{edge}$ becomes log |V| similarly with the RMAT model. Calculation of $T_{edge}$ will be described further later. A case of AVS-O will be described since the analysis for AVS-I is similar to that of AVS-O. The space complexity of AVS is expressed as in Equation 8.

$$S^+_{graphAVS} = \max_{i \in V} d_i^+ = d^+_{max} \quad \text{[Equation 8]}$$

In Equation 8, $d_{max}$ is the maximum out/in-degree of a vertex.

Table 1 shows a summary of the time and space complexities of four approaches under the scope-based generation model. In Table 1, AES means the original Kronecker method. Table 1 indicates the AVS approach is theoretically the best one for generation of a large-scale graph, since $d_{max}$ is much smaller than |E|, and there is no $T_{shuffle}$ and $T_{merge}$.

TABLE 1

| | Time complexity | Space complexity |
| --- | --- | --- |
| WES | O(|E|log|V|) | O(|E|) |
| AES | $O\left(\frac{|V|^2}{P}\right)$ | O(1) |
| FastKronecker | O(|E|log|V|) | O(|E|) |
| WES/p | $O\left(\frac{|E|\log|V|}{P}\right) + T_{shuffle} + T_{merge}$ | $O\left(\frac{|E|}{P}\right)$ |
| AVS | $O\left(\frac{|E|\log|V|}{P}\right)$ | $O(d_{max})$ |

"Recursive Vector Model"

An example of the recursive vector model following the AVS approach will be described. The recursive vector model may significantly reduce memory usage, and at the same time, improve a speed of generation of edges practically, compared with methods that do not utilize the recursive vector model. Its basic idea is (1) constructing a very small and pre-computed vector, called RecVec, and (2) generating edges very efficiently by repeatedly searching RecVec on a CPU cache.

Using the recursive vector model, the graph generating apparatus may determine out-degree and in-degree distributions efficiently and independently. An example of determining out-degree distributions (that is, the sizes of scopes in the AVS approach), and an example of determining in-degree distributions (that is, generation of edges using RecVec in each scope) will be described further.

The former is summarized in Theorem 1, and the latter is summarized in Theorem 2. In particular, Theorem 2 is supported by two Lemmas: Lemma 3 about the property of scale symmetry existing in RecVec; and Lemma 4 about the property of translational symmetry existing in RecVec. Both the sizes of scopes and the edges in a scope are determined through a stochastic process. Otherwise, a generator may generate an unrealistic graph in terms of graph properties.

"Determination of Scope Size"

A whole Kronecker matrix produced by a seed matrix is denoted as $\mathbb{K}$. Each element $\mathbb{K}_{u,v}$ of $\mathbb{K}$ indicates a probability of generating an edge from u to v for a target synthetic graph. FIG. 3B shows a Kronecker matrix $\mathbb{K} = K^{\otimes 3}$ from an initial seed matrix K of FIG. 3A. A case of SKG using 2×2 seed matrix $$K = \begin{bmatrix} K_{0,0} & K_{0,1} \\ K_{1,0} & K_{1,1} \end{bmatrix} = \begin{bmatrix} \alpha & \beta \\ \gamma & \delta \end{bmatrix}$$

is described. That is the same with the case of RMAT. Then, $\mathbb{K} = K^{\otimes \log |V|}$.

Each $\mathbb{K}_{u,v}$ is calculated by a series of products among $\alpha$, $\beta$, $\gamma$ and $\delta$. Such a series of products is denoted as $P_{u \to v}$. Given a seed matrix K, $|\alpha|_{u,v}$, $|\beta|_{u,v}$, $|\gamma|_{u,v}$, and $|\delta|_{u,v}$ are defined as the multiplicities of $\alpha$, $\beta$, $\gamma$ and $\delta$, in $P_{u \to v}$, respectively, where $|\alpha|_{u,v} + |\beta|_{u,v} + |\gamma|_{u,v} + |\delta|_{u,v} = \log |V|$. Then, $P_{u \to v}$ is equal to $\alpha^{|\alpha|_{u,v}} \beta^{|\beta|_{u,v}} \gamma^{|\gamma|_{u,v}} \delta^{|\delta|_{u,v}}$.

To exploit bitwise operations, a vertex ID is considered as a binary string. If the most significant bit (MSB) of a source vertex u is 0, it indicates that u exists in $\alpha$ or $\beta$ quadrant. Likewise, if the MSB of a destination vertex v is 0, it indicates that v exists in $\alpha$ or $\gamma$ quadrant. A logical bit operator Bits(x) is defined, and Bits(x) returns the number of 1 bits in a binary string x. Proposition 1 is provided as follows, where & denotes a bitwise AND operator, and ~ denotes a bitwise NOT operator.

Proposition 1. Probability of an Edge from u to v.

A probability of generating an edge from u to v may be calculated using a bit operator Bits(·) as in Equation 9, when representing vertex IDs u and v as binary strings.

$$\mathbb{K}_{u,v} = \alpha^{Bits(-u \& -v)} \beta^{Bits(-u \& v)} \gamma^{Bits(u \& -v)} \delta^{Bits(u \& v)} \quad \text{[Equation 9]}$$

Proposition 1 indicates that two vertices (in bit strings) of an edge may determine the number of quadrant selections for each quadrant. By using Proposition 1, the probability of generating an edge from u to v in a constant time may be calculated when using a fixed-size type for vertex IDs. Lemma 1 is described by neglecting a destination vertex v for a certain source vertex u.

Lemma 1. Probability of an Edge from u.

The probability of generating an edge from u may be calculated as in Equation 10.

$$P_{u \to} = (\alpha + \beta)^{Bits(-u)} \cdot (\gamma + \delta)^{Bits(u)} \quad \text{[Equation 10]}$$

PROOF: Equation 11 is satisfied. Therefore, Equation 10 is satisfied.

$$\sum_{v \in V} \mathbb{K}_{u,v} = \quad \text{[Equation 11]}$$

$$(K_{u[0],v[0]} + K_{u[0],\sim v[0]}) \times (K_{u[1],v[1]} + K_{u[1],\sim v[1]}) \times \ldots \times$$

$$(K_{u[L],\sim v[L]} + K_{u[L],\sim v[L]}) = \prod_{i \in [0:L]} K_{u[i],v[i]} + K_{u[i],\sim v[i]}$$

The size of the scope $\mathbb{S}(i, V)$ is defined. The size of $\mathbb{S}(i, V)$ is a sum of all the edges to be generated in the scope. An existence of an edge has the Bernoulli distribution, and multiple trials for the edges in a scope have the binomial distribution. By the Central Limit Theorem, the binomial distribution with a large number of trials may be approximated by the normal distribution, where the size of the scope $\mathbb{S}(i, V)$, that is, the degree of a vertex i may be summarized as in Theorem 1. $|\mathbb{S}(I, J)|$ in Algorithm 2 is not deterministic, but stochastic following Theorem 1.

Theorem 1. Size of a Scope $\mathbb{S}(i, V)$.

It is denoted that n=|E| and $p = \Sigma_{j \in V} P_{i \to j} = P_{i \to}$. Then, the size of a scope $\mathbb{S}(i, V)$ has approximately a normal distribution with $\mu = np$ and $\sigma = \sqrt{np(1-p)}$.

PROOF of Theorem 1: The size of a scope is the number of successes of edge generation within the scope $\mathbb{S}(i, V)$. A binomial experiment includes a sequence of n trials for distinguishing either success or fail, and a success probability per each trial is p, since the trials are independent and identical. n and p denote the number of trials and the success probability for each trial, respectively. Here, n=|E| and $p = \Sigma_{j \in V} P_{i \to j} = P_{i \to}$. The size of a scope follows the binomial distribution B(n, p), and may approximate the normal distribution N(np, np(1-p)) for very large n and very small p.

"Determination of Edge"

Figure 4A:
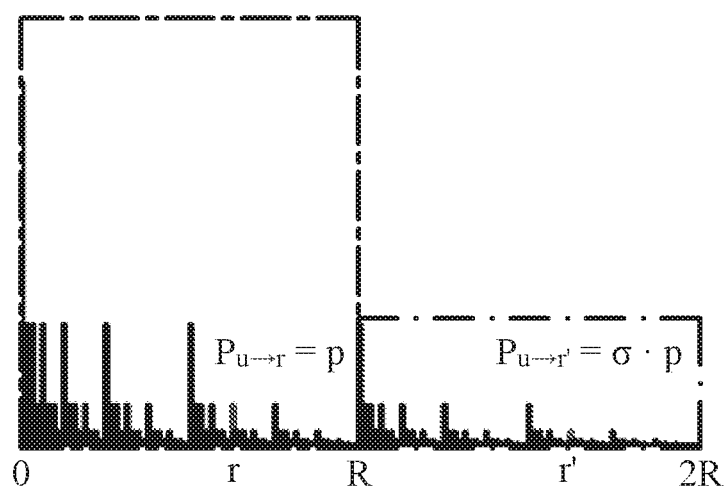
FIGS. 4A and 4B illustrate functions for recursive vector models according to an embodiment.
Figure 4B:
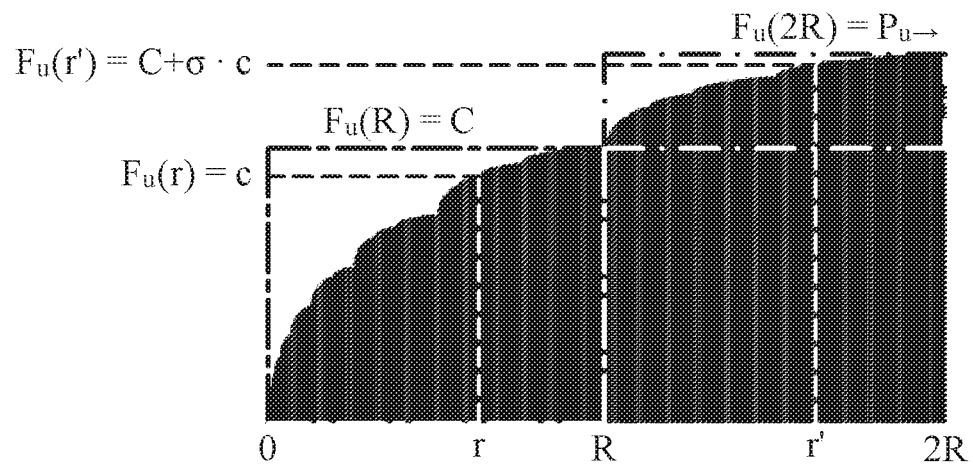

For a source vertex u, $|\mathbb{S}(u, V)|$ edges are generated according to Theorem 1. The naive method that may determine a destination vertex of each edge uses an inverse function $F_u^{-1}()$ of a cumulative density function (CDF) $F_u()$ of a source vertex u. FIG. 4A shows a plot of a probability mass function (PMF) of the source vertex u for a small synthetic graph generated with parameters $$K = \begin{bmatrix} 0.57 & 0.19 \\ 0.19 & 0.05 \end{bmatrix}$$

and $|V| = 2^{10}$. FIG. 4B shows the corresponding CDF function $F_u()$. Here, it is assumed that 2R=|V| and $F_u(r) = c$. Then, the naive method generates a real value x using a uniform random variable $\mathbb{U}(0, F_u(|V|))$, and finds a destination vertex of u by calculating $F_u^{-1}(x)$. For example, in FIG. 4B, it is assumed that a area value c is generated from $\mathbb{U}(0, F_u(|V|))$, and then, a destination vertex becomes r since $F_u^{-1}(c) = r$. A probability that a destination vertex r(0≤r<2R) is selected follows the distribution of FIG. 4A.

The naive method stores all the CDF values for u into a vector (CDF vector) and finds a destination vertex $F_u^{-1}(x)$ for a given random value x by performing either a linear search or a binary search on the CDF vector. The first row of Table 2 shows the time and space complexities of the naive method.

TABLE 2

| Data Structure | Search Method | Time complexity | Space complexity |
|---|---|---|---|
| CDF | linear | $O(|V|)$ | $O(|V|)$ |
| vector | binary | $O(\log|V|)$ | $O(|V|)$ |
| RecVec | binary | $O(\log|V|)$ | $O(\log|V|)$ |

The time complexity using a binary search, that is, $O(\log |V|)$ for determination of a single edge is the same with that of RMAT. The problem of the naive method is the space complexity. For a trillion-scale graph of $2^{36}$ vertices, the amount of memory required is about 274 gigabytes (GB) when using 4-byte single precision type for representing CDF values. It is definitely impossible to generate a trillion-scale graph using the naive method.

The graph generating apparatus may determine a destination vertex using a recursive vector called RecVec. Theoretical time and space complexities of a recursive vector model are $O(\log |V| \cdot \log \log |V|)$ and $O(\log |V|)$, respectively. Here, the term $\log \log |V|$ in the time complexity is due to a binary search on a vector of a length $\log |V|$, which will be described in detail later. However, the term $\log \log |V|$ may be practically disregarded due to the following two reasons. First, $\log \log |V|$ is a small and almost constant value. For example, in a trillion-scale graph, $\log \log |V|$ is only about 5.16, and even in a quadrillion-scale graph, $\log \log |V|$ is only about 5.52. Second, RecVec is on a CPU cache, and so, the cost of a binary search on RecVec is practically negligible. As a result, the practical time complexity becomes as in the second row of Table 2. The graph generating apparatus may significantly reduce the amount of memory required, and so, generate a trillion-scale graph using a cluster of personal computers (PCs). For example, in a trillion-scale graph, the amount of memory for RecVec is only about 36×8=288 bytes. Although the size of data structure for generating edges is so small, a set of edges that are already generated in a scope should be maintained for checking repeat edges. That space is $O(d_{max})$, and so, the overall space complexity becomes as in Table 1.

The graph generating apparatus constructs RecVec of length $\log |V|+1$ using the recursive vector model, and generates $|S(u, V)|$ edges, each of which takes $O(\log |V| \cdot \log \log |V|)$ time. Intuitively, RecVec stores values at positions of power of 2 in the CDF vector, that is, the values at 0, 1, 3, 7, ..., $2^{\log |V|}-1$, and so, the length of RecVec becomes $\log |V|+1$. RecVec for a source vertex u is defined in Definition 2. For simplicity, it is assumed that a CDF function has a domain between 1 to $|V|$, instead of between 0 to $|V|-1$. For example, is a summation of probabilities between $P_{u \to 0}$ and $P_{u \to 5}$.

Definition 2. Recursive vector RecVec of a Vertex u.

For a recursive vector RecVec[0: $\log |V|$] for a source vertex u, each element of RecVec[x]($0 \le x \le \log |V|$) is defined as in Equation 12.

$$RecVec[x] = F_u(2^x) = \sum_{v=0}^{2^x-1} P_{u \to v}$$ [Equation 12]

It may take $O(|V|)$ time to construct RecVec using a summation of $P_{u \to v}$. The graph generating apparatus may construct RecVec in $O(\log |V|)$ time using Lemma 2.

Lemma 2 may exploit characteristics of a stochastic process based on seed probability parameters.

Lemma 2. CDF Value at the Positions of Power of 2.

It is assumed that $x \in [0: \log |V|]$. $\gg$ is a logical right shift operator. Then, a value of an element of RecVec is defined as in Equation 13.

$$RecVec[x] = \left(\frac{\alpha}{\alpha+\beta}\right)^{\log|V|-x-Bits(u \gg x)} \cdot \left(\frac{\gamma}{\gamma+\delta}\right)^{Bits(u \gg x)} \cdot P_{u \to}$$ [Equation 13]

PROOF: Equation 14 is satisfied. Therefore, Equation 13 is satisfied.

[Equation 14]

$$F_u(2^x) = \prod_{i \in [0:x-1]} (K_{u[i],v[i]} + K_{u[i],\sim v[i]}) \times \prod_{i \in [x:L]} K_{u[i],v[i]}$$

$$= \prod_{i \in [0:L]} (K_{u[i],v[i]} + K_{u[i],\sim v[i]}) \times \prod_{i \in [x:L]} \frac{K_{u[i],v[i]}}{K_{u[i],v[i]} + K_{u[i],\sim v[i]}}$$

$$= P_{u \to} \cdot \prod_{i \in [x:L]} \frac{K_{u[i],v[i]}}{K_{u[i],v[i]} + K_{u[i],\sim v[i]}}$$

An example of Lemma 2 is described with reference to FIG. 5A. For a source vertex u=2, a corresponding RecVec is [0.05, 0.07, 0.105, 0.147]. For x=2, RecVec[2]=$F_2(2^2)$= 0.05+0.02+0.025+0.01=0.105 by Definition 2. If Lemma 2 is used for calculating the same element, $$RecVec[2] = \left(\frac{0.5}{0.7}\right)^{3-2-Bits(010_2 \gg 2)} \cdot \left(\frac{0.2}{0.3}\right)^{Bits(010_2 \gg 2)} \cdot P_{2 \to} =$$

$$\left(\frac{0.5}{0.7}\right)^1 \cdot \left(\frac{0.2}{0.3}\right)^0 \cdot 0.147 = 0.105.$$

Here, $010_2$ is a binary string for the value 2, and $P_{2 \to}=0.147$.

An example in which the graph generating apparatus determines a destination vector based on RecVec in $O(\log |V| \cdot \log \log |V|)$ time. Two properties for recursive selection on RecVec will be described: scale symmetry and translational symmetry. Lemma 3 representing a property of scale symmetry intuitively indicates that there is a constant ratio $\sigma$ between a probability of determining a vertex r and that of determining a vertex r'. Here, it is assumed that r'=r+R, and $0 \le r < R$.

Lemma 3. Property of Scale Symmetry

For each $R=2^k$ ($0 \le k < \log |V|$), a constant ratio $\sigma_{u[k]}$ is maintained for $\forall r: 0 \le r < R$, in the PMF distribution for a source vertex u. u[k] indicates a k-th bit of a vertex u in a binary string starting from the right most least significant bit (LSB). $\sigma_{u[k]}$ is as in Equation 15.

$$\sigma_{u[k]} = \frac{P_{u \to (R+r)}}{P_{u \to r}} = \frac{K_{u[k],1}}{K_{u[k],0}}$$ [Equation 15]

PROOF: Where r'=r+R, and $0 \le r < R = 2^k$, a ratio $\sigma$ between the probability of determining the vertex r and that of determining the vertex r' is denoted as in Equation 16.

$$\sigma = \frac{P_{u \to r}}{P_{u \to r'}} = \frac{\prod_{i \in [0:L]} K_{u[i],r[i]}}{\prod_{i \in [0:L]} K_{u[i],r'[i]}} \quad \text{[Equation 16]}$$

A different between r and r' is only a k-th bit value, that is, 0 for r[k] and 1 for r'[k]. In $\forall i: i \in [0, L]$, Equation 17 is satisfied. Therefore, Equation 15 is satisfied.

$$\frac{K_{u[i],r'[i]}}{K_{u[i],r[i]}} = \begin{cases} 1, & \text{if } i \neq k \\ \frac{K_{u[i],1}}{K_{u[i],0}}, & \text{if } i = k \end{cases} \quad \text{[Equation 17]}$$

In Lemma 3, $K_{u[k],1}$ indicates a probability parameter of either an upper right quadrant or a lower right quadrant depending on a bit value of u[k]. An example of Lemma 3 will be described with reference to FIGS. 3A and 3B. For a source vertex u=2, the graph generating apparatus first checks a constant ratio $\sigma_{u[k]}$ for a positive integer k=log |V|−1=2, that is, R=$2^k$=4. Since 2[2]=$010_2$[2]=0, that is, the MSB of $010_2$, $$\sigma_{2[2]} = \frac{P_{2 \to (4+r)}}{P_{2 \to r}} = \frac{K_{0,1}}{K_{0,0}} = \frac{0.2}{0.5}$$

according to the seed matrix of FIG. 3A. This ratio is maintained while r varies in 0≤r<4. For example, for r=1, $$\frac{P_{2 \to 5}}{P_{2 \to 1}} = \frac{0.008}{0.02} = \frac{0.2}{0.5}.$$

If k is changed, then the ratio may be changed. For example, for k=1 and R=2, $$\sigma_{2[1]} = \frac{P_{2 \to (2+r)}}{P_{2 \to r}} = \frac{K_{1,1}}{K_{1,0}} = \frac{0.1}{0.2}$$

since 2[1]=$010_2$[1]=1. In fact, for a seed probability matrix of 2×2, there are only up to two different ratios for each source vertex u, $\sigma_0$ and $\sigma_1$.

Lemma 4 presents the property of translational symmetry. The graph generating apparatus may convert by using the constant ratios above where c'<c according to Lemma 4. The graph generating apparatus may convert $F_u^{-1}(c)$ recursively with a smaller c until c becomes less than, which indicates that there is no index k satisfying $F_u(2^k) \leq c < F_u(2^{k+1})$.

Lemma 4. Property of Translational Symmetry

For each R=$2^k$(0<k<log |v), Equation 18 is satisfied for $\forall$r: 0≤r<R in the CDF distribution for a source vertex u.

$$F_u(R+r)=F_u(R)+\sigma_{u[k]} \cdot F_u(r) \quad \text{[Equation 18]}$$

PROOF: Equation 19 is satisfied. Therefore, Equation 18 is satisfied.

$$F_u(R+r) = \sum_{v=0}^{R+r-1} P_{u \to v} = \sum_{v=0}^{R-1} P_{u \to v} + \sum_{v=R}^{R+r-1} P_{u \to v} \quad \text{[Equation 19]}$$

$$= \sum_{v=0}^{R-1} P_{u \to v} + \frac{K_{u[k],1}}{K_{u[k],0}} \cdot \sum_{v=0}^{r-1} P_{u \to v}$$

$$= F_u(R) + \frac{K_{u[k],1}}{K_{u[k],0}} \cdot F_u(r) = F_u(R) + \sigma_{u[k]} \cdot F_u(r)$$

An example of Lemma 4 will be described with reference to FIGS. 4A through 5B. FIG. 4B shows that $F_u(r')=F_u(R)+\sigma_{u[k]} \cdot F_u(r)$ when r'=R+r and k=log |V|−1. The graph generating apparatus may convert $F_u^{-1}(C+\sigma_{u[k]} \cdot c)$ to $F_u^{-1}(c)$ using C=$F_u(R)$ and $\sigma_{u[k]}$. FIG. 5B shows that $F_2(4+r)=F_2(4)+\sigma_{2[2]} \cdot F_2(r)$ when u=2, k=2 and R=4. Especially, r=2, $F_2(4+2)=F_2(4)+\sigma_{2[2]} \cdot F_2(2)=0.105+\frac{2}{5} \cdot 0.07=0.133$. Since $F_2(4)$ is already stored in RecVec[2], and $\sigma_{2[2]}$ may be easily calculated using a seed matrix as in Lemma 3, the graph generating apparatus may efficiently utilize Lemma 4 for recursive selection.

Theorem 2 to generate an edge from a source vertex u using Lemma 3 and Lemma 4 will be described. The basic idea of edge generation using the recursive vector model is to translate a given random value x until finding a destination vertex $F_u^{-1}(x)$. In detail, the graph generating apparatus may generate an edge by the following five operations: (1) generating a random value x following a uniform random variable $\mathbb{U}$ (0, $F_u(|V|)$); (2) finding an index k satisfying $F_u(2^k) \leq x < F_u(2^{k+1})$ (O(log log |V|)); (3) inserting k to a set θ and translating x using Lemma 4; (4) repeating the operations (2)-(3) until there is no index k satisfying $F_u(2^k) \leq x < F_u(2^{k+1})$ (O(log log |V|)); and (5) determining an edge (u, v), where u=$\Sigma_{k \in \theta} 2^k$.

Theorem 2. Determination of an Edge

Given a source vertex u and a random value x following $\mathbb{U}$ (0, $F_u(|V|)$), x is recursively translated to a position of a certain destination v using the property of translational symmetry on CDF as in Equation 20.

$$F_u^{-1}(x) = \quad \text{[Equation 20]}$$

$$\begin{cases} 2^k + F_u^{-1}\left(\frac{x - F_u(2^k)}{\sigma_{u[k]}}\right), & \text{if } \exists k: F_u(2^k) \leq x < F_u(2^{k+1}) \\ 0, & \text{otherwise} \end{cases}.$$

PROOF: By Lemma 4, Equation 21 is satisfied. Hence, Equation 22 is satisfied, and then, Equation 23 is satisfied.

$$x = F_u(R+r) \text{ and } x' = F_u(r), \quad \text{[Equation 21]}$$
$$F_u(R+r) = F_u(R) + \sigma_{u[k]} \cdot F_u(r) \Longleftrightarrow F_u(r) =$$
$$\frac{F_u(R+r) - F_u(R)}{\sigma_{u[k]}} \Longleftrightarrow x' = \frac{x - F_u(R)}{\sigma_{u[k]}}$$

$$F_u^{-1}(x) = R + r \text{ and } F_u^{-1}(x') = r \quad \text{[Equation 22]}$$

$$F_u^{-1}(x) - F_u^{-1}(x') = R = 2^k \Longleftrightarrow F_u^{-1}(x) = \quad \text{[Equation 23]}$$
$$2^k + F_u^{-1}(x') \Longleftrightarrow F_u^{-1}(x) = 2^k + F_u^{-1}\left(\frac{x - F_u(R)}{\sigma_{u[k]}}\right)$$

The inverse function recourses itself until there is no index k satisfying $F_u(2^k) \leq x < F_u(2^{k+1})$, and then indicates the destination vertex v.

Figures 5A, 5B:
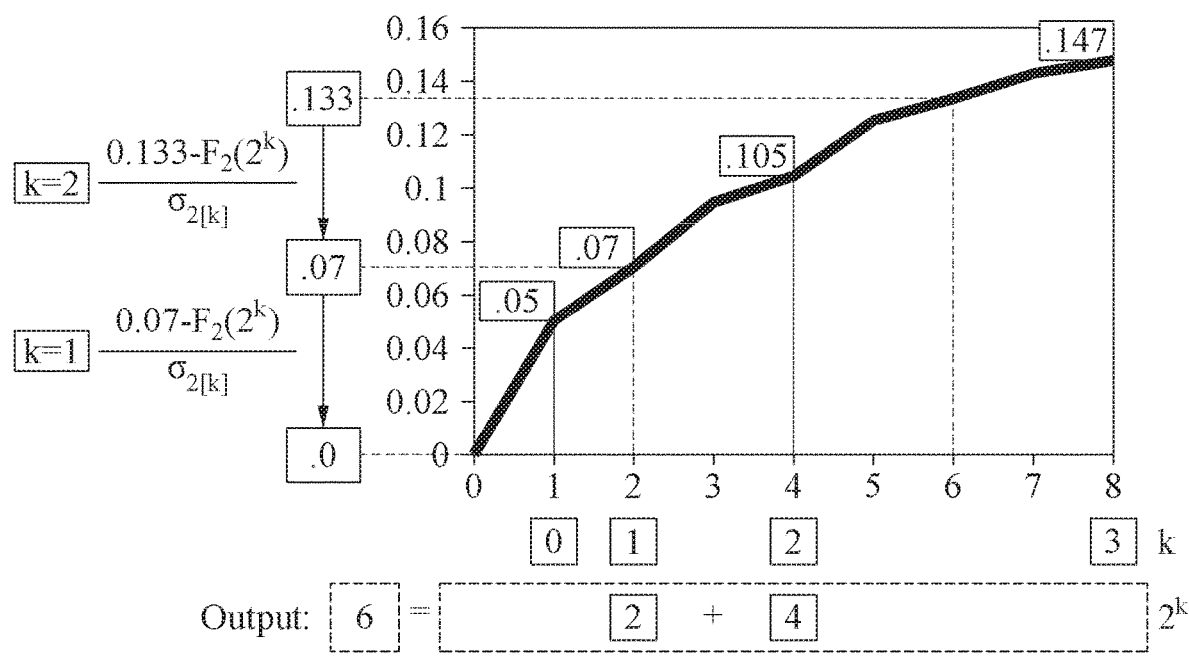
FIGS. 5A and 5B illustrate an example of determining a destination vertex.

FIGS. 5A and 5B show an example in which the graph generating apparatus generating an edge. It is assumed that a source vertex u=2, and a random value x=0.133. FIG. 5A shows RecVec for u. In the first iteration, k=2 satisfies $F_2(2^k) \le x < F_2(2^{k+1})$ since $F_2(2^2)=0.105$, and $F_2(2^3)=0.147$ in RecVec. Thus, θ={2}, and $$F_2^{-1}(0.133) = 2^2 + F_2^{-1}\left(\frac{0.133 - 0.105}{0.4}\right) = 2^2 + F_2^{-1}(0.07).$$

In the second iteration, k=1 satisfies $F_2(2^k) \le x < F_2(2^{k+1})$ since $F_2(2^1)=0.07$, and $F_2(2^2)=0.105$ in RecVec. Thus, θ={1, 2} and $$F_2^{-1}(0.07) = 2^1 + F_2^{-1}\left(\frac{0.07 - 0.07}{1.0}\right) = 2^1 + F_2^{-1}(0).$$

In the third iteration, there is no k satisfying the condition, and so, the graph generating apparatus stops the iteration and determines an edge (u, v)=(2, 6), where $v=\Sigma_{k \in \theta} 2^k = 4+2$.

The graph generating apparatus may generate a large-scale synthetic graph fast using TrillionG. The scale-up feature is achieved mainly using a very small-sized scope by the AVS model. The speed-up feature is achieved mainly due to the reduced time complexity by P as in Table 1. In terms of performance, the recursive vector model contains the following three key ideas: (1) reusing pre-computed RecVec; (2) reducing the number of recursions; and (3) reducing the number of random value generations.

Reusing pre-computed RecVec: The graph generating apparatus constructs a small pre-computed vector RecVec per each scope using TrillionG and uses the corresponding vector repeatedly for determining all edges within the corresponding scope. Since the size of RecVec is O(log |V|) as in Table 1, RecVec may easily be kept in a CPU cache during generation of all adjacent edges from a source vertex. For example, when |E| is one trillion, the length of RecVec is just 36. On the contrary, RMAT may not reuse a pre-computed result like RecVec since RMAT inherently requires O(log |V|) recursions for determination of an edge. The graph generating apparatus may perform each recursion very fast with only a single binary search upon RecVec in the cache using TrillionG.

Reducing the number of recursions: The number of recursions for a destination edge is O(log |V|) in RMAT. In contrast, the graph generating apparatus using TrillionG may perform recursions as many times as the number of vertex IDs to be generated using Theorem 2. If the degree distribution is uniformed, that is, α=β=γ=δ=0.25, about 50% of bits in a bit string may be 1s. However, non-equal seed parameters are used for the skewness of the degree distribution, and the number of 1s becomes much smaller than $$\frac{\log|V|}{2}.$$

Lemma 5 shows a relationship between the number of 1s and given seed parameters.

Lemma 5. The Number of 1s in a Binary String.

Let bitStr be a bit string of a destination vertex ID, and $bitStr_1$ be the number of 1s in bitStr. Then, $bitStr_1$ is approximately converged to Equation 24.

$$binStr_1 \approx \frac{\log|V|}{\frac{\alpha+\beta}{\beta} + 1 - \frac{\beta \cdot (\gamma+\delta)}{\delta \cdot (\alpha+\beta)}} \quad \text{[Equation 24]}$$

PROOF: Equation 25 is satisfied. Therefore, Equation 24 is satisfied.

$$\begin{aligned} binStr_1 &= \sum_{i=0}^{\log|V|-1} 0 \cdot P[v(i)=0] + 1 \cdot P[v(i)=1] \quad \text{[Equation 25]} \\ &= \sum_{i=0}^{\log|V|-1} \frac{\beta}{\alpha+\beta} \cdot \sim u(i) + \frac{\delta}{\gamma+\delta} \cdot u(i) \\ &= bitSum(\sim u) \cdot \frac{\beta}{\alpha+\beta} + bitSum(u) \cdot \frac{\delta}{\gamma+\delta} \\ &\approx (\log|V| - binStr_1) \cdot \frac{\beta}{\alpha+\beta} + binStr_1 \cdot \frac{\delta}{\gamma+\delta} \\ \Longleftrightarrow binStr_1 &\approx \frac{\log|V|}{\frac{\alpha+\beta}{\beta} + 1 - \frac{\beta \cdot (\gamma+\delta)}{\delta \cdot (\alpha+\beta)}} \end{aligned}$$

For standard seed parameters K=[0.57, 0.19; 0.19, 0.05], the number of 1s is approximately converged to $$\frac{\log|V|}{4.917}.$$

That is, the number of recursions is reduced by up to 4.917 times.

Reducing the number of random value generations: RMAT needs to generate a random value for each recursion in order to decide a quadrant. On the contrary, the graph generating apparatus using TrillionG may generate a random value only once and use the random value continuously until the graph generating apparatus determines a destination vertex using Theorem 2. This idea may reduce the number of random value generations by up to log |V| times.

"TrillionG System"

A TrillionG system based on the recursive vector model will be described. Algorithm 4 is a scope generation function for TrillionG, which is based on a framework of Algorithm 2. The size of a scope $\mathbb{S}$(u, V), that is, the number of edges generated is determined by Theorem 1. Then, the graph generating apparatus may determine the destination vertex v through the recursive selection process described in Theorem 2 by using RecVec of the range [0: log |V|] and a random value from a uniform random distribution $\mathbb{U}$ of the range [0: RecVec[log |V|]. The graph generating apparatus returns v using a DetermineEdge function, and then, generates a new edge (u, v).

---

Algorithm 4 Scope Generation for TrillionG

---

Input: $\mathbb{S}$ (u, V) /* a scope for source vertex u */
1: edgeSet ← ∅
2: numEdges ← |$\mathbb{S}$ (u, V)|/* by Theorem 1 */
3: RecVec ← create RecVec for a vertex u
4: while count(edgeSet) ≤ numEdges do
5:   x ← a random value from $\mathbb{U}$ (0, cdfVec[log|V|])
6:   u ← DetermineEdge(x, RecVec) /* by Theorem 2 */

| Algorithm 4 Scope Generation for TrillionG |
|---|
| 7:    edgeSet ← edgeSet ∪ {(u, v)}<br>8:    Store(edgeSet) |

Algorithm 5 presents the DetermineEdge function in detail. For simplicity, $F_u(2^k)$ is denoted as $F(2^k)$ in the pseudo code. Line 2 searches an index k satisfying the condition, and its time complexity becomes $O(\log \log |V|)$ by using the binary search on RecVec, which is almost a constant time even for a quadrillion-scale graph. Line 3 calculates σ for the index k, and then, Line 4 calculates an updated value x'. With the updated value, Line 5 calls the DetermineEdge function recursively, and the values $\{2^k\}$ are accumulated for determination of a destination vertex ID v. Line 7 is a stop condition of recursion. If x<RecVec[0] at the first call of the function, the destination vertex ID becomes v=0. For the in-memory representation in RecVec, the graph generating apparatus may use BigDecimal, which approximately matches to the IEEE 128-bit floating-point type, for accurate trillion-scale graph generation.

| Algorithm 5 DetermineEdge |
|---|
| Input:  x/*random value*/<br>           RecVec/*recursive vector*/<br>1:  if x ≥ RecVec[0] then<br>2:     k ← find the index k, s.t. $F(2^k) \leq x < F(2^{k+1})$<br>3:     $\sigma \leftarrow \frac{\text{RecVec}[k+1] - \text{RecVec}[k]}{\text{RecVec}[k]}$ /* by Lemma 3 and 4 */<br>4:     $x' \leftarrow \frac{x - \text{RecVec}[k]}{\sigma}$<br>5:     return $2^k$ + DetermineEdge(x', RecVec)<br>6:  else<br>7:     return 0 /*stop condition of recursion*/ |

In general, how to split the workload into machines has a large impact on the performance for a parallel method. The parallel methods such as RMAT/p tend to have workload skewness where different numbers of edges are gathered via shuffling and sort merged in each machine. On the contrary, TrillionG may prevent workload skewness by evenly partitioning a set of edges to generate into machines before edge generation. The ideal number of edges for each machine may be $$\frac{|E|}{p},$$

where p is the number of threads. The graph generating apparatus may achieve the ideal number of edges by AVS-level partitioning instead of edge-level partitioning.

Figure 6:
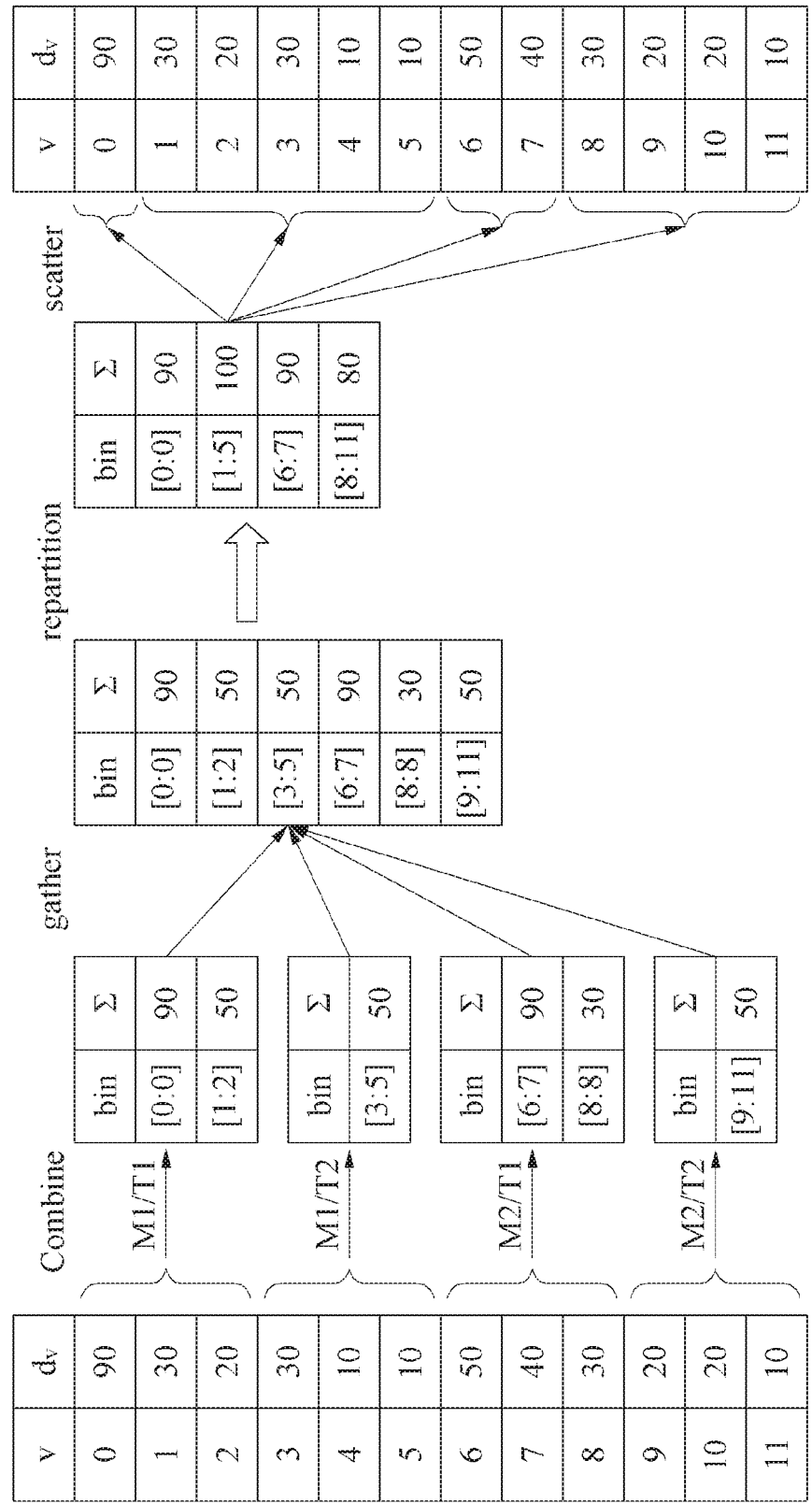
FIG. 6 illustrates a graph generating method according to an embodiment.

FIG. 6 shows the AVS-level partitioning technique of TrillionG. The AVS-level partitioning technique includes four operations: combine, gather, repartition, and scatter. It is assumed that there are two machines M1 and M2, each machine has two threads T1 and T2, and |E|=360. There are a total of twelve scopes (vertices). In the combining operation, each thread determines the sizes of scopes, that is, $d_v$, by Theorem 1 and combines those sizes according to $$\frac{|E|}{p}.$$

Here, each thread takes an equal number of scopes. For example, M1/T1 determines the sizes of the first three scopes and combines the sizes such that a sum of sizes of each bin becomes about $$\frac{|360|}{4} = 90.$$

Here, a sum of sizes of the last bin is usually smaller than 90. In the gathering operation, the bins of all threads are sent to a master thread, that is, M1/T1, where network communication overhead is quite small since just bin sizes are sent. In the repartitioning operation, a master thread combines and repartitions the scopes of bins such that the size of each bin becomes about $$\frac{|E|}{p}.$$

In the scattering operation, each bin is sent to each thread such that a thread generates the edges of the scopes corresponding to the bin.

The graph format affects the performance of graph processing, but is frequently overlooked in a graph generator. The TrillionG system supports three major graph formats: an edge list text format (shortly, TSV); a 6-byte adjacency list binary format (shortly, ADJ6); and a 6-byte compressed sparse row (CSR) binary format (shortly, CSR6). Here, in order to support trillion-scale graphs, using at least 6-byte representation is necessary. Most of graph generators only support the TSV format.

TSV is a text format with one edge per line, and so, TSV is verbose and slow due to parsing overhead and input/output (I/O) cost. ADJ is a binary format where each vertex is stored along with its adjacency list. ADJ has little overhead and is well supported by TrillionG since neighbors of each vertex are generated on the same machine. CSR is like ADJ, but vertices in a file are sorted and at the same time, vertices in each adjacency list are also sorted. Two binary formats, ADJ6 and CSR6, need 6-byte representation of vertex IDs. The file sizes in ADJ6 are usually 3-4 times smaller than those in TSV. As a concrete example, for Scale 38 (that is, $|V|=2^{38}$), the TSV file is approximately 90 terabytes (TB), while the ADJ6 file is 25 TB.

In terms of in-memory representation, the double-precision floating-point type may not be accurate enough to present a probability used in edge generation for trillion-scale graphs. In particular, RecVec has such an issue for finding an accurate position of a destination vertex. Thus, TrillionG may use the BigDecimal type for RecVec. However, an example of using representation is not limited thereto, and various standards may be applied.

"Rich Graph Generation"

TrillionG is a fast and scalable engine that generates a large-scale synthetic graph following stochastic models. In the literature, there are a number of graph generators that generate small-scale, but semantically richer synthetic graphs having various properties such as multiple node types and edge predicates. The graph generators may be classified into schema-driven methods and data-driven methods, depending on the constraint type. Since most of the techniques used in those methods and the techniques used in TrillionG are orthogonal to each other, TrillionG may be easily extended so as to generate a rich large-scale synthetic graph. Hereinafter, how to extend TrillionG so as to generate graphs supported by gMark, a representative schema-driven method. An example of extending the recursive vector model will be described first, and an example of generating a rich graph using the extended recursive vector model will be described later.

"Extension of Recursive Vector Model"

The recursive vector model may generate a graph in which an out-degree distribution is equal to an in-degree distribution. Further, the recursive vector model may generate a graph in which a range of source vertices is equal to that of destination vertices. The extended recursive vector model may generate a graph having different in-/out-degree distributions and different ranges for source and destination vertices. Such different distributions and ranges are core concepts used in schema-driven rich graph generation methods.

The two key operations of the recursive vector model are (1) determination of a scope size for a source vertex in Theorem 1 and (2) determination of a set of edges from the source vertex in Theorem 2. The original recursive vector model uses the same seed parameters $\alpha$, $\beta$, $\gamma$ and $\delta$ for the two key operations, and thus generates a graph having the same in-/out-degree distribution. The extended recursive vector (ERV) model allows each key operation to use different seed parameters in order to generate a graph having different in-/out-degree distributions.

Intuitively, under the AVS-O approach (the black area in FIG. 2C), the scope sizes correspond to the out-degree distribution, and the edge determination within each scope determines the in-degree distribution. Thus, the ERV model determines the out-degree distribution by setting the seed parameters for the scope sizes (Theorem 1), and determines the in-degree distribution by setting the seed parameters for edge determination (Theorem 2). The former parameters are denoted as $K_{out}[\cdot]$ and the latter parameters are denoted as $K_{in}[\cdot]$. For example, a graph in which the out-degree distribution is Zipfian, but the in-degree distribution is Gaussian is considered. The ERV model may generate a graph by setting $K_{out}[\cdot]$ as Zipfian and $K_{in}[\cdot]$ as Gaussian.

Different seed parameters $K[\alpha, \beta; \gamma, \delta]$ generate different degree distributions including Zipfian and Gaussian. Table 3 shows a few degree distributions generated by the corresponding seed parameters in the ERV model.

TABLE 3

| Seed parameters | Degree distribution |
| --- | --- |
| $K_{out}[\alpha, \beta; \gamma, \delta]$ | Zipfian with slope $\log(\gamma + \delta) - \log(\alpha + \beta)$ |
| $K_{in}[\alpha, \beta; \gamma, \delta]$ | Zipfian with slope $\log(\beta + \delta) - \log(\alpha + \gamma)$ |
| $K[0.25, 0.25; 0.25, 0.25]$ | Gaussian with $\mu = \frac{|E|}{|V|}$ |

Lemma 6 proves the relationship between the seed parameters and the Zipfian distribution.

Lemma 6. Zipfian Distribution and Seed Parameters.

$K[\alpha, \beta; \gamma, \delta]$ generates the Zipfian out-degree distribution of a slope $\log(\gamma+\delta)-\log(\alpha+\beta)$ or the Zipfian in-degree distribution of a slope $\log(\beta+\delta)-\log(\alpha+\gamma)$.

PROOF: The Zipfian distribution includes two elements, rank and frequency, where a frequency of a Rank-th frequent data item is inversely proportional to its Rank. In addition, the shape of Zipfian is described by its slope, especially, a log-log slope of the rank-frequency distribution of Equation 26.

$$Freq \propto Rank^{slope} \Leftrightarrow slope = \frac{\Delta \log(Freq)}{\Delta \log(Rank)} \qquad \text{[Equation 26]}$$

By using Lemma 1, a probability (frequency) of a $2^k$-th ranked vertex in the out-degree distribution may be calculated as in Equation 27.

$$Freq(2^k)=(\alpha+\beta)^{\log|V|-k}\times(\gamma+\delta)^k \qquad \text{[Equation 27]}$$

Then, by using the frequencies of two arbitrary $2^{k_1}$-th and $2^{k_2}$-th ranked vertices, an equation for the slope may be derived as in Equation 28.

$$\frac{\Delta\log(Freq)}{\Delta\log(Rank)} = \frac{\log Freq(2^{k_1}) - \log Freq(2^{k_2})}{\log(2^{k_1}) - \log(2^{k_2})} =$$

$$\frac{\log((\alpha+\beta)^{\log|V|-k_1} \times (\gamma+\delta)^{k_1})}{k_1 - k_2} -$$

$$\frac{\log((\alpha+\beta)^{\log|V|-k_2} \times (\gamma+\delta)^{k_2})}{k_1 - k_2} =$$

$$\frac{(\log|V|-k_1)\log(\alpha+\beta) + k_1\log(\gamma+\delta)}{k_1 - k_2} -$$

$$\frac{(\log|V|-k_2)\log(\alpha+\beta) + k_2\log(\gamma+\delta)}{k_1 - k_2} =$$

$$\log(\gamma+\delta) - \log(\alpha+\beta)$$

[Equation 28]

Thus, $K[\alpha, \beta; \gamma, \delta]$ generates the Zipfian out-degree distribution of a slope $\log(\gamma+\delta)-\log(\alpha+\beta)$. The Zipfian in-degree distribution may also be proved in the same manner.

The ERV model may precisely control the slope of the Zipfian distribution by adjusting seed parameters, which is not supported by the gMark method. For example, the standard seed parameters $K=[0.57, 0.19; 0.19, 0.05]$ used in Graph500 match the Zipfian distribution with a slope $-1.662$. In addition to Zipfian and Gaussian, gMark also supports the normal distribution, which is very easy to generate by using a simple random function.

How the ERV model supports different ranges for source and destination vertices will be described. Let $V_{src}$ be the range of source vertices and $V_{dst}$ be the range of destination vertices. Under the AVS-O approach, if $|V_{src}| \geq |V_{dst}|$, a rectangle probability matrix of $|V_{src}| \times |V_{src}|$ is considered. Then, when generating an edge (u, v) by Theorem 2, $$v' = \text{round}\left(\left|\frac{V_{dst}}{V_{src}}\right| \cdot v\right)$$

is calculated as a destination vertex in $V_{dst}$, where round($\cdot$) is the nearest integer function. If $|V_{src}|<|V_{dst}|$, the above method under the AVS-I approach may be used.

"Schema-Driven Graph Generation"

The schema-driven methods such as gMark use so-called graph configuration for describing a rich synthetic graph to generate. The graph configuration includes three tables for node types, edge predicates, and in-/out-degree distributions. FIG. 7A shows an example of graph configuration for a bibliographical synthetic graph in gMark. There are four node types, each of which has different ratios, i.e., ranges of vertices, and three edge predicates, each of which has different ratios. There are also three different degree distributions. Among the different degree distributions, it is indicated that all the edges having researcher as a source node type and paper as a target node type have author as its predicate, where the out-degree distribution follows Zipfian and the in-degree distribution follows Gaussian.

TrillionG may generate a rich synthetic graph described in a graph configuration by using the ERV model. TrillionG conceptually divides the entire probability matrix according to the ranges of vertices of each node type. FIG. 7B shows the matrix divided by four node types, where the range of researcher vertices is denoted as $V_{researcher}$. Then, three degree distributions of FIG. 7A correspond to colored rectangles in FIG. 7B. For example, the largest colored rectangle indicates the first degree distribution. TrillionG may generate each colored rectangle according to the method described above. In detail, $E_{author}$ indicates a set of edges having the author predicate, of which the size is 50% of |E|.

TrillionG based on the ERV model not only generates a much larger rich graph that may not be generated by gMark, but also generates a semantically more correct graph than gMark. A graph generation algorithm proposed in gMark may not remove duplicated edges, and so, may generate the same edge multiple times. For example, there may be multiple copies of the same edge indicating that paper x is published in conference y. In contrast, TrillionG eliminates such duplicates by default.

Figure 8:
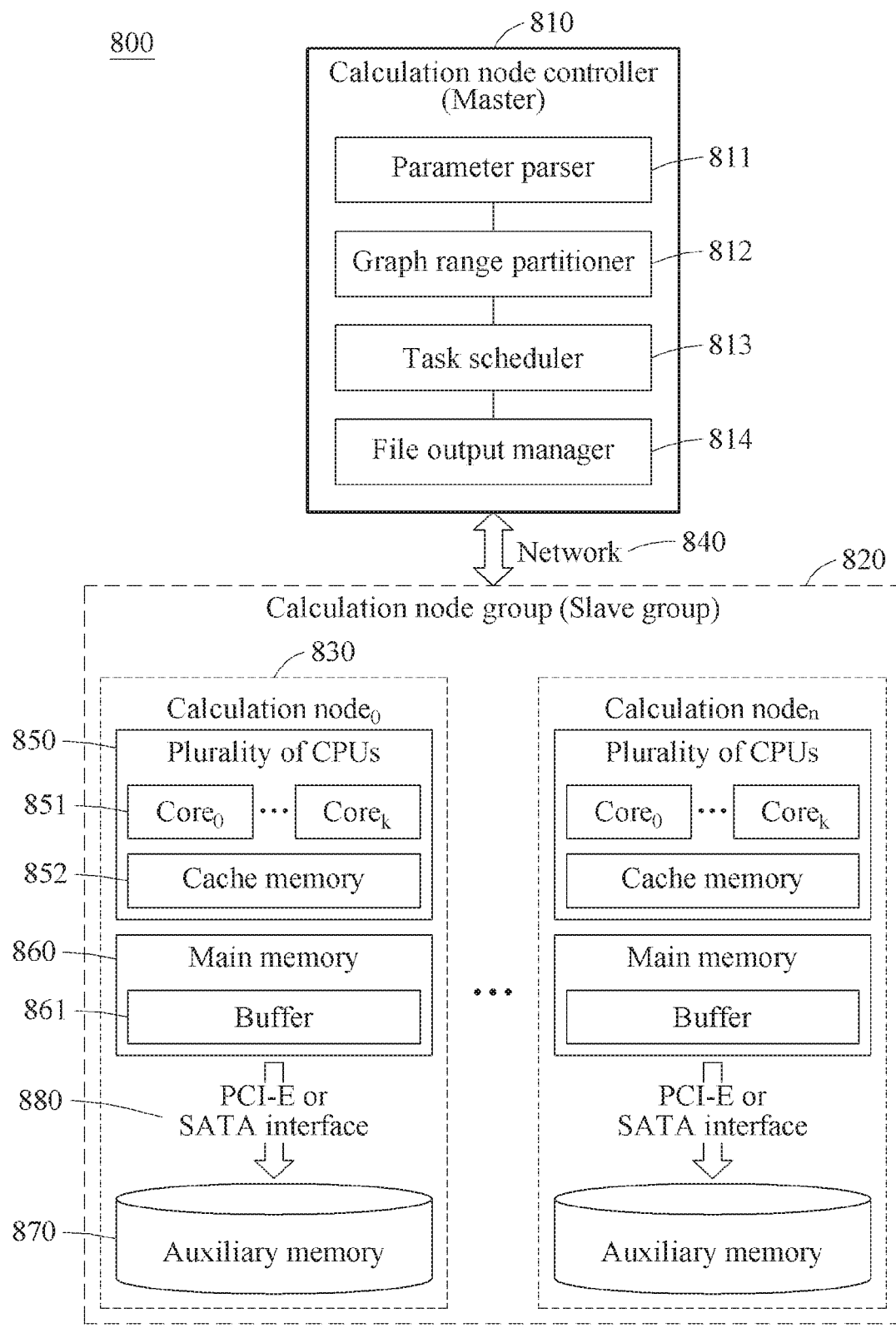
FIG. 8 illustrates a graph generating apparatus according to an embodiment.

FIG. 8 illustrates a graph generating apparatus according to an embodiment.

Referring to FIG. 8, a graph generating apparatus 800 may include a calculation node controller (master) 810, and a calculation node group (slave group) 820. The calculation node controller (master) 810 may manage the calculation node group (slave group) 820 that performs a small-scale actual calculation, and the calculation node group (slave group) 820 may perform an operation of generating and storing a divided graph. The calculation node group (slave group) 820 may include at last one calculation node 830. The calculation node controller (master) 810 and the calculation node group (slave group) 820 may be connected via a network 840).

The calculation node controller 810 may include a parameter parser 811, a graph range partitioner 812, a task scheduler 813, and a file output manager 814. The parameter parser 811 may acquire properties of a synthetic graph to generate from a user as parameters and configure an overall workload of synthetic graph generation. The graph range partitioner 812 may partition a range of graph data to generate based on a vertex prior to the synthetic graph generation. The task scheduler 813 may split workloads in a parallel/distributed manner. The file output manager 814 may store data generated by each calculation node 830 from a buffer 861 of a main memory 860 to an auxiliary memory 870.

Each calculation node 830 may include a plurality of CPUs 850, the main memory 860, and the auxiliary memory 870. The CPUs 850 may include a plurality of cores 851 and a cache memory 852. Here, the cache memory 852 is the CPU cache described above. The main memory 860 may include the buffer 861 that temporarily stores a portion of a synthetic graph generated by each core 851. The auxiliary memory 870 may be connected to each calculation node 830 through a PCI-E or SATA interface 880.

Figure 9:
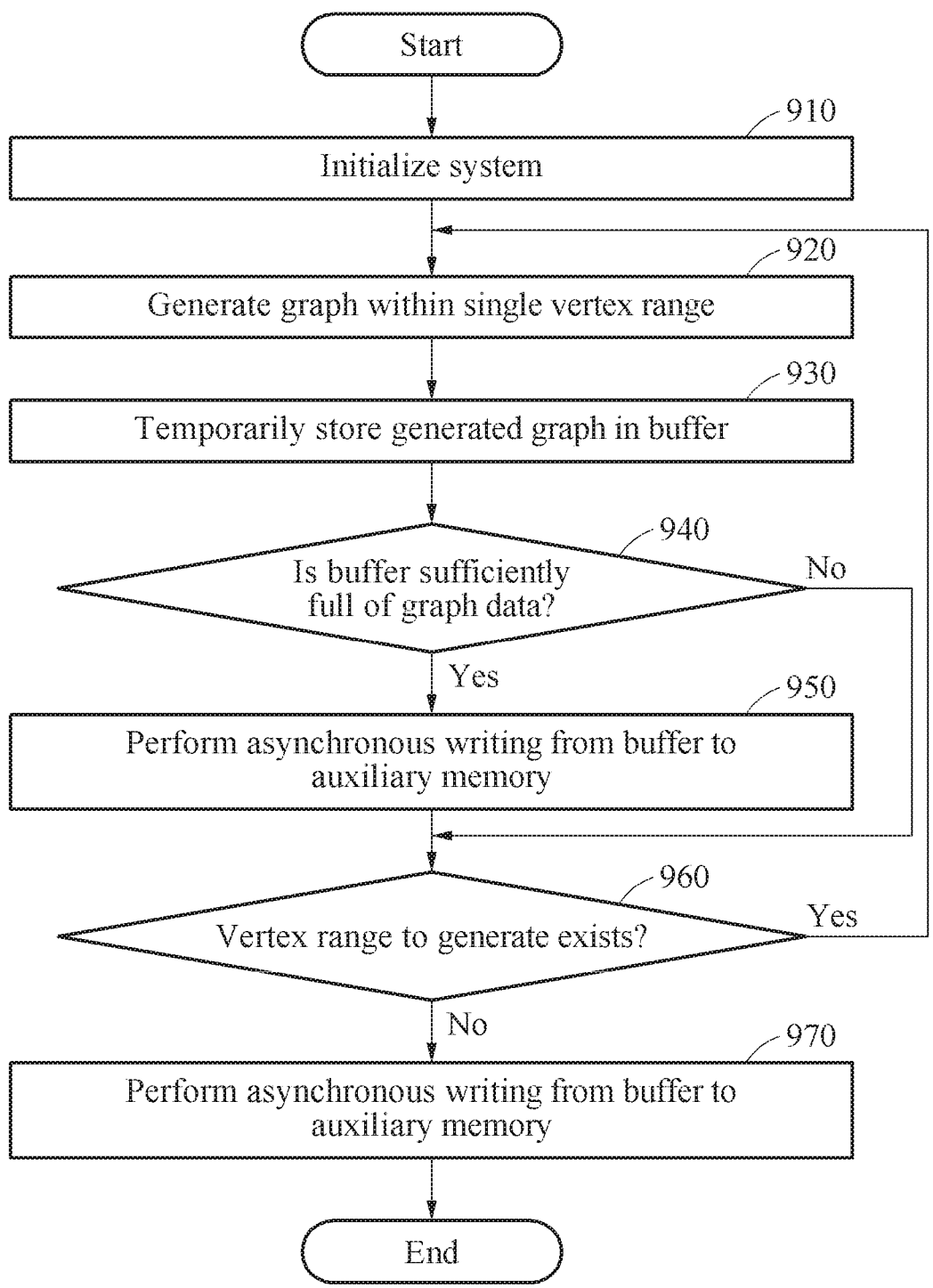
FIG. 9 is a flowchart illustrating a graph generating method according to an embodiment.

FIG. 9 is a flowchart illustrating a graph generating method according to an embodiment.

Referring to FIG. 9, in operation 910, a graph generating apparatus may initialize a system for generating a synthetic graph. In operation 920, the graph generating apparatus may generate a synthetic graph within a single vertex range. The graph generating apparatus may initialize the system using the parameter parser and the graph range partitioner described above. The graph generating apparatus may assign a partitioned graph generation task of a vertex unit to a core of each calculation node through the task scheduler described above, and the core may perform a task of generating all edges connected to a single vertex as a partitioned graph of the vertex range. An operation of generating a graph in a unit of a single vertex range will be described with reference to FIG. 11.

Operations 930 through 950 corresponds to a process of storing the generated graph in the buffer and the auxiliary memory through the file output manager described above. In operation 930, the graph generating apparatus may temporarily store data of the generated graph in the buffer after the calculation nodes generate all the edges connected to the single vertex within a scope of a vertex. The scope may be determined based on the number of vertices. In this example, the buffer may be large enough to contain all the edges connected to at least one vertex. In operation 940, the graph generating apparatus may determine whether the buffer is sufficiently full of data, and determine whether to perform a writing operation on the auxiliary memory. In operation 950, the graph generating apparatus may perform an asynchronous writing task from the buffer to the auxiliary memory.

In operation 960, the graph generating apparatus may determine whether a vertex range to generate exists. In operation 970, the graph generating apparatus may perform an asynchronous writing task for all data of the pre-generated partitioned graph in the buffer to the auxiliary memory based on a determination result of operation 960. If a vertex range to generate exists, the graph generating apparatus may return to operation 920 and repeat the graph generating task.

Figure 10:
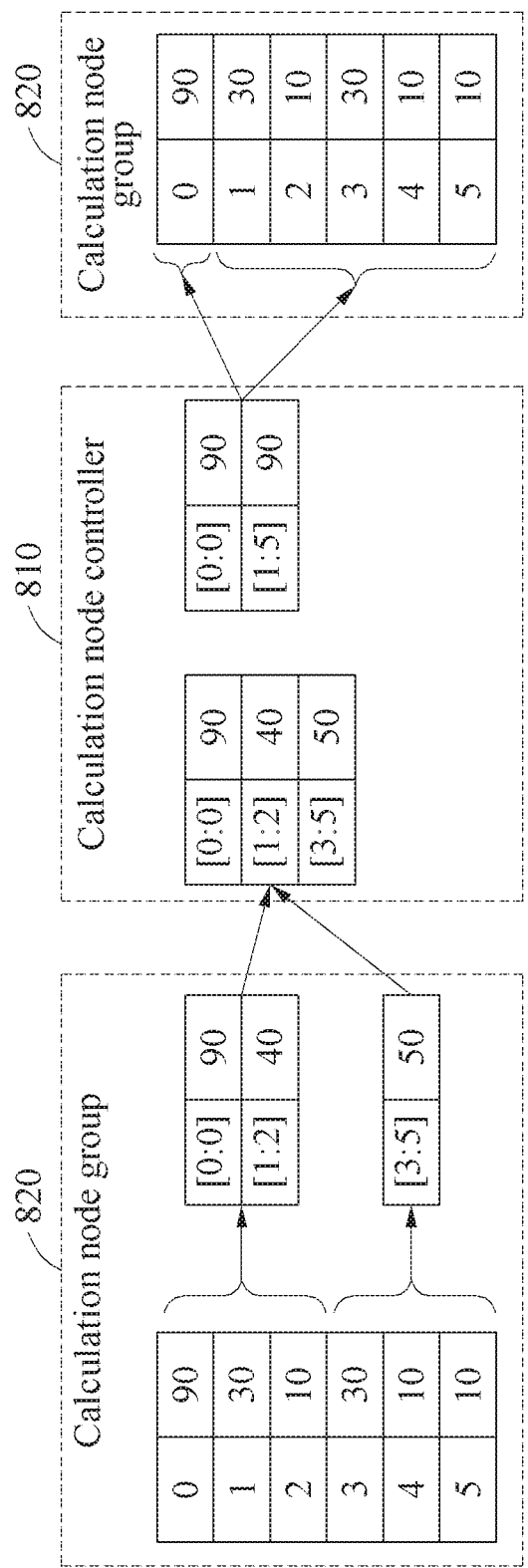
FIG. 10 illustrates an example of distributing a task for graph generation according to an embodiment.

FIG. 10 illustrates an example of distributing a task for graph generation according to an embodiment.

An example of applying the operation of FIG. 6 to elements of a graph generating apparatus is described with reference to FIG. 10. The graph generating apparatus may partition vertices to process into vertex ranges having a divided satellite data size using computing resources of the calculation node group 820. The task distribution operation for graph generation may be performed by the graph range partitioner of the calculation node controller 810.

The graph generating apparatus may calculate the number of edges to generate from each vertex. The graph generating apparatus may determine the numbers of edges of vertices based on predefined probability parameters and the total number of edges to generate between the vertices.

The graph generating apparatus may combine the numbers of edges calculated to correspond to the size of the graph partitioned satellite data that each calculation node of the calculation node group 820 should have. The graph generating apparatus may partition the vertices for the calculation nodes based on the total number of edges and the number of calculation nodes, and generate the vertex ranges by combining the partitioned vertices. The graph generating apparatus may gather the numbers of edges combined by the graph range partitioner of the calculation node controller 810 through a network.

The calculation node controller 810 of the graph generating apparatus may repartition the vertex ranges to correspond to the partitioned satellite data size for the calculation nodes. The graph generating apparatus may repartition the vertex ranges for the calculation nodes based on the total number of edges and the number of calculation nodes. The calculation node controller 810 of the graph generating apparatus may scatter the repartitioned vertex ranges to the calculation nodes of the calculation node group 820. The graph generating apparatus may assign the vertices to be processed by the calculation nodes to the calculation nodes based on the vertex ranges repartitioned for the calculation nodes. In addition, a method of calculating the number of edges connected to a vertex in FIGS. 3A and 3B may use a process of calculating the number of edges of a single vertex of FIGS. 5A and 5B has.

Referring to FIG. 10, it is assumed that there are vertices 0 to 5 and two calculation nodes. The calculation node group 820 may calculate the number of edges connected to a vertex, thereby determining that 90 edges may be generated for the vertex 0, 30 edges may be generated for the vertex 1, 10 edges may be generated for the vertex 2, 10 edges may be generated for the vertex 4, and 10 edges may be generated for the vertex 5.

The calculation node group 820 may combine the number of edges in a size that the partitioned phase data should have. Since the total number of edges is 180 and the number of the calculation nodes is 2, the calculation node group 820 may combine the number of vertices in 90 data sizes. A vertex range [0:0] may have a total of 90 edges, a vertex range [1:2] may have a total of 40 edges, and a vertex range [3:5] may have a total of 50 edges. The graph generating apparatus may gather the numbers of edges through the graph range partitioner, and the graph range partitioner may perform the repartition process. The graph range partitioner may generate, based on the total of 90 edges, range partition information indicating that a vertex range [0:0] has a total of 90 edges and a vertex range [1:5] has a total of 90 edges. The graph range partitioner may scatter the range partition information to the calculation node group 820. The zeroth calculation node may process graph generation of the vertex range for the vertex 0, and the first calculation node may process graph generation of the vertex range for the vertices 1 to 5.

Figure 11:
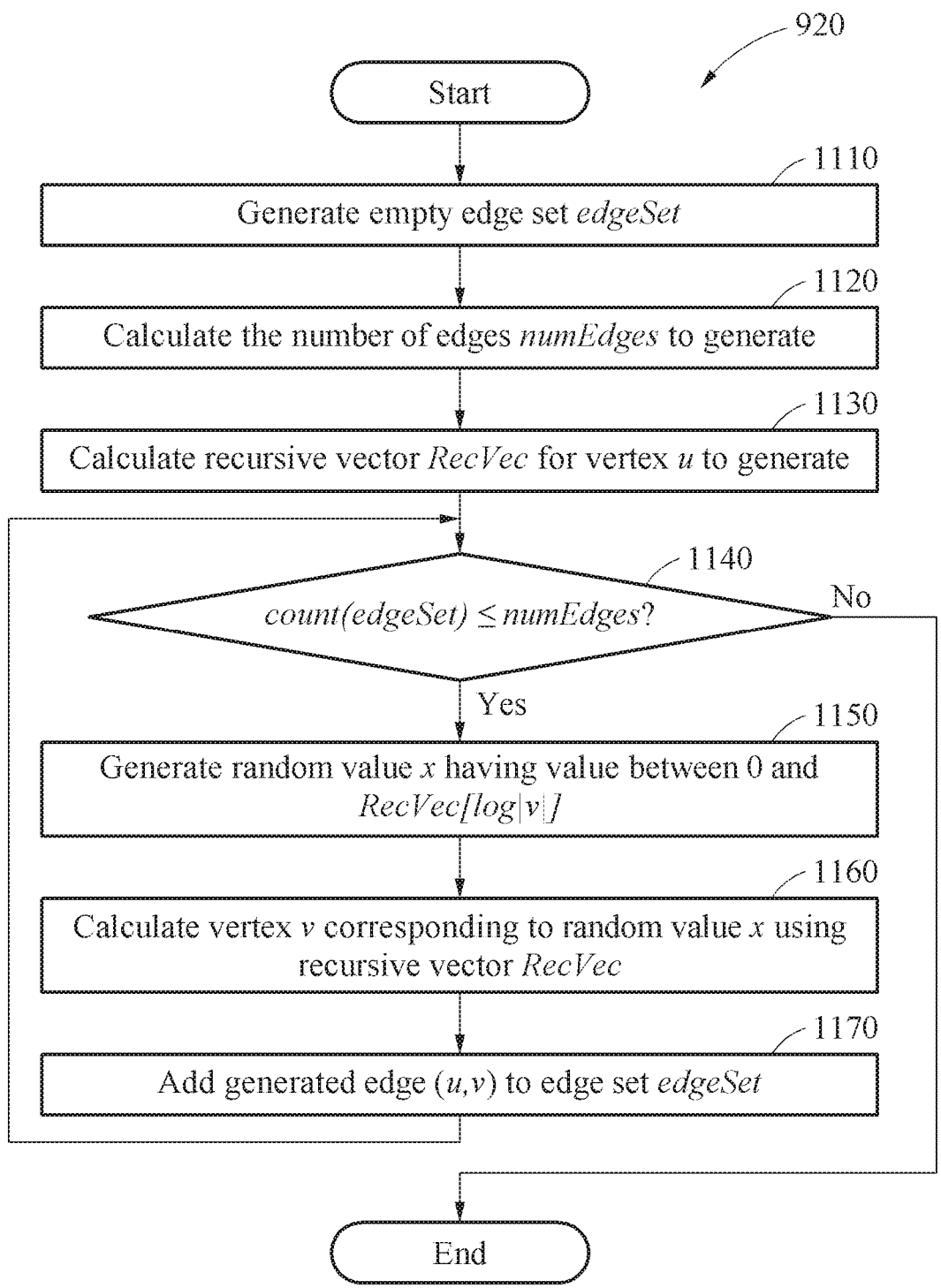
FIG. 11 is a flowchart illustrating an example of generating a graph in a unit of one vertex according to an embodiment.

FIG. 11 is a flowchart illustrating an example of generating a graph in a unit of one vertex according to an embodiment.

In operation 1110, a graph generating apparatus may generate an empty edge set edgeSet. The graph generating apparatus may calculate the number of edges numEdge to generate from a source vertex. An operation of calculating the number of edges will be described further with reference to FIG. 12. In operation 1130, the graph generating apparatus may calculate a recursive vector RecVec for a vertex to generate (source vertex) u. An operation of generating the recursive vector will be described further with reference to FIG. 13

In operation 1140, if the number of elements of edgeSet is less than or equal to numEdges, the graph generating apparatus may generate a new edge and add the generated edge to edgeSet; otherwise, may terminate edge generation. In operation 1150, the graph generating apparatus may generate a random value x having a uniform distribution between 0 and RecVec[log |V|]. In operation 1160, the graph generating apparatus may determine a destination vertex v corresponding to the random value x using the recursive vector RecVec. An operation of determining the destination vertex will be described further with reference to FIG. 14. In operation 1170, the graph generating apparatus may generate an edge (u,v) connecting the source vertex and the destination vertex and add the edge (u,v) to the set of edges edgeSet.

Figure 12:
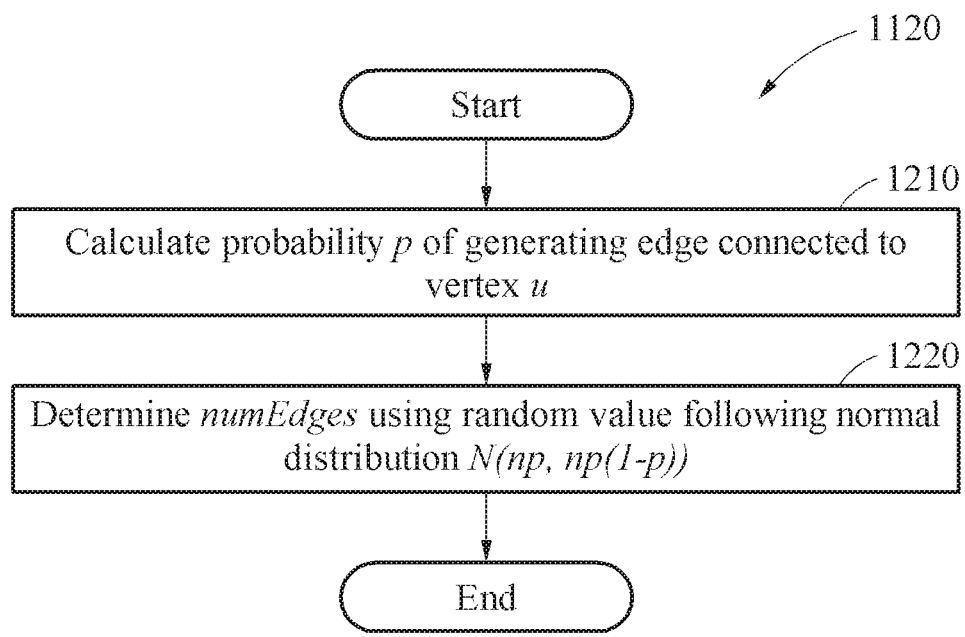
FIG. 12 is a flowchart illustrating an example of determining the number of edges according to an embodiment.

FIG. 12 is a flowchart illustrating an example of determining the number of edges according to an embodiment.

A graph generating apparatus may determine the target number of at least one edge to generate from a source vertex based on a stochastic distribution following a probability of generating an edge from a vertex and the total number of edges, for example, the number of edges connected between vertices.

Referring to FIG. 12, in operation 1210, the graph generating apparatus may calculate a probability p of generating an edge connected from a vertex u based on predefined probability parameters. The graph generating apparatus may calculate the probability based on the number of 1 bits of a binary string corresponding to the vertex and the probability parameters of which the sum is 1. The graph generating apparatus may calculate the probability of generating an edge connected from the source vertex u using $P_{u\rightarrow} = (\alpha+\beta)^{Bits(\sim u)} \cdot (\gamma+\delta)^{Bits(u)}$. Here, $P_{u\rightarrow}$ denotes the probability, u denotes the binary string corresponding to the source vertex, $\sim$ denotes a bitwise NOT operator, Bits(x) denotes a local bit operator which returns the number of 1 bits in a binary string x, and $\alpha$, $\beta$, $\gamma$ and $\delta$ denote the probability parameters of which the sum is 1.

In operation 1220, the graph generating apparatus may determine the number of edges numEdges using a random value following a normal distribution N(np, np(1−p)). Here, n denotes the total number of edges between vertices, and p denotes the probability of generating an edge connected from the vertex.

Figure 13:
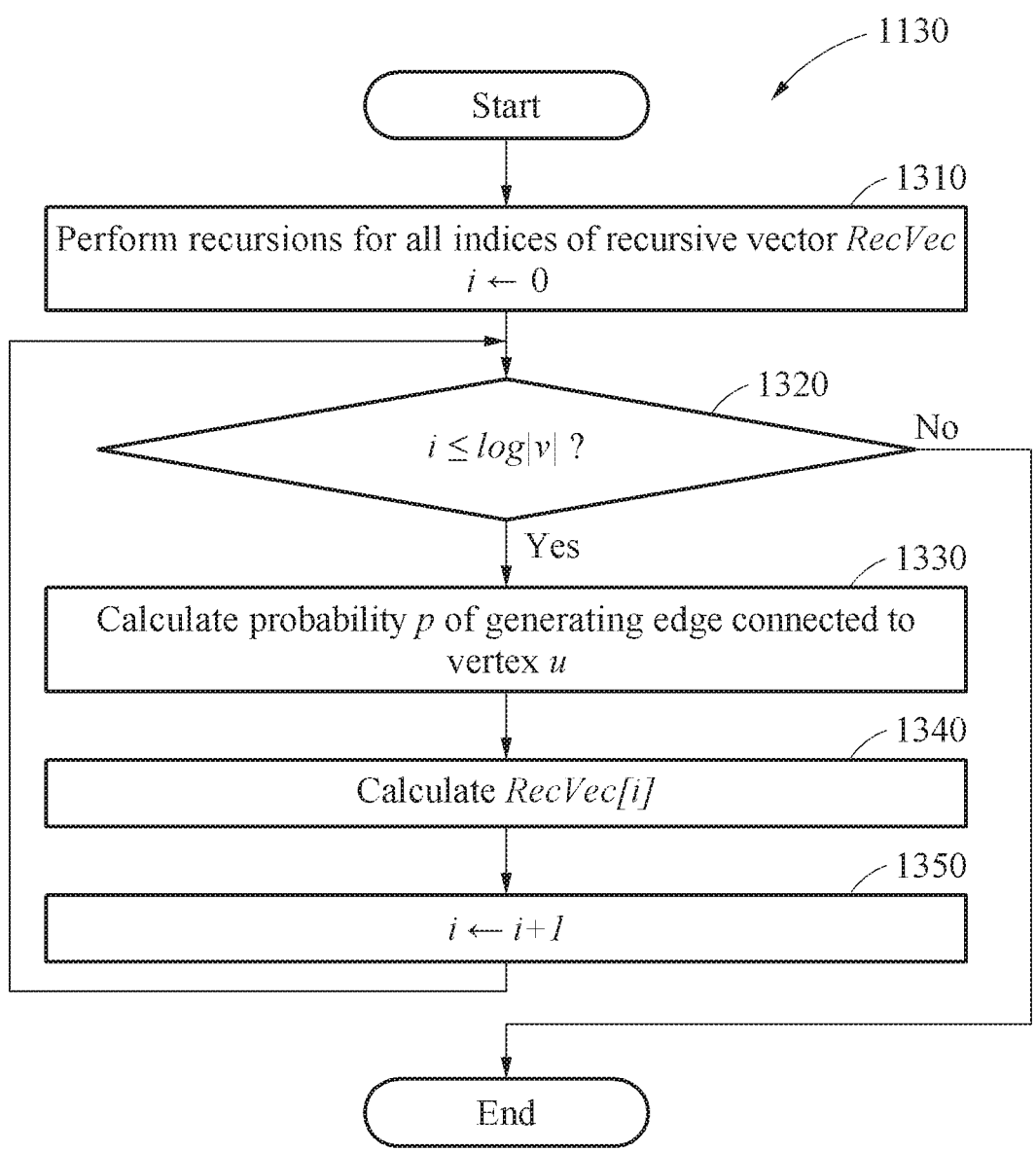
FIG. 13 is a flowchart illustrating an example of generating a recursive vector according to an embodiment.

FIG. 13 is a flowchart illustrating an example of generating a recursive vector according to an embodiment.

A graph generating apparatus may calculate a probability of generating an edge connected from a source vertex based on predefined probability parameters, and generate a recursive vector having values of elements corresponding to indices based on the calculated probability, the probability parameters, and the number of vertices. The graph generating apparatus may generate the values of the elements of the recursive vector for each of indices satisfying a predefined condition, using $$RecVec[x] = \left(\frac{\alpha}{\alpha+\beta}\right)^{\log|V|-x-Bits(u\gg x)} \cdot \left(\frac{\gamma}{\gamma+\delta}\right)^{Bits(u\gg x)} \cdot P_{u\rightarrow}.$$

Here, x denotes an index, RecVec[x] denotes a value of an element of the recursive vector corresponding to x, $\alpha$, $\beta$, $\gamma$ and $\delta$ denote the probability parameters of which the sum is 1, |V| denotes the number of vertices, $\gg$ denotes a logical right shift operator, Bits(u$\gg$x) denotes a logical bit operator which returns the number of 1 bits in a binary string u$\gg$x, denotes the probability, and the predefined condition is x≤log |V|. Since the length of the recursive vector is log |V|+1, the recursive vector may be stored in a CPU cache as described above.

Referring to FIG. 13, in operation 1310, the graph generating apparatus may perform recursions for all indices of a recursive vector RecVec, and initialize an index i to 0. Operations 1310, 1320 and 1350 indicate iterations for all the indices of the recursive vector RecVec. In operation 1320, the graph generating apparatus may determine whether i≤log |V|. In operation 1330, the graph generating apparatus may calculate a probability p of generating an edge connected from a vertex u based on a determination result of operation 1320. In operation 1340, the graph generating apparatus may calculate RecVec[i]. In operation 1350, the graph generating apparatus may update i to i+1.

Figure 14:
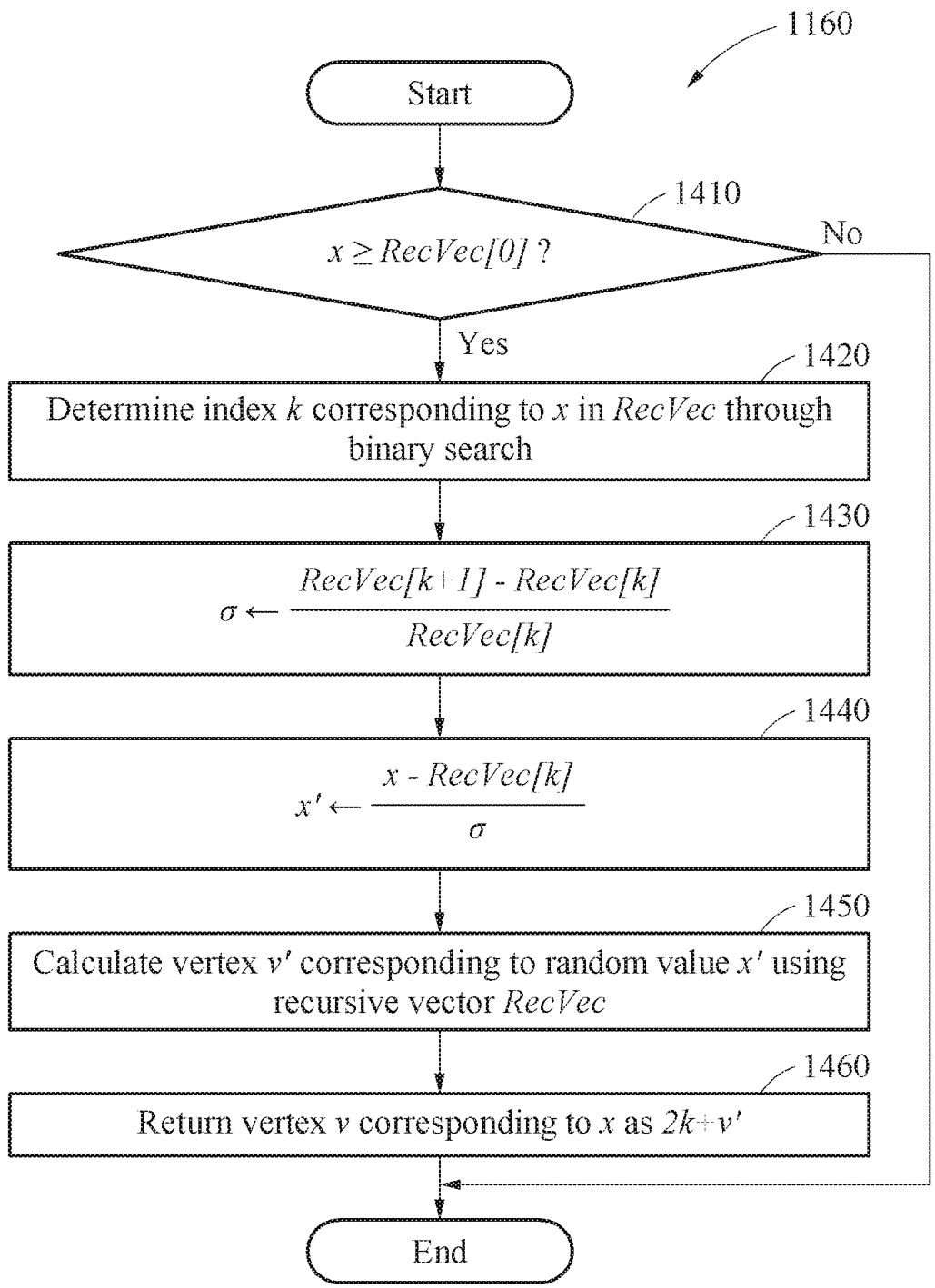
FIG. 14 is a flowchart illustrating an example of determining a destination vertex and generating an edge according to an embodiment.

FIG. 14 is a flowchart illustrating an example of determining a destination vertex and generating an edge according to an embodiment.

A graph generating apparatus may determine at least one destination vertex by repeatedly performing a binary search for a recursive vector until edges corresponding to the desired number of edges are generated from a source vertex, and generate at least one edge corresponding to the determined destination vertex. The graph generating apparatus may generate a random value based on the recursive vector and the number of vertices. The graph generating apparatus may generate the random value based on a value of an element of the recursive vector corresponding to the number of vertices. In an example, the random value is a value between 0 and RecVec[log |V|], where |V| denotes the number of vertices, and RecVec[log |V|] denotes the value of the element of the recursive vector corresponding to log |V|.

The graph generating apparatus may determine the destination vertex corresponding to the random value using the recursive vector, and generate an edge between the source vertex and the destination vertex. The graph generating apparatus may determine at least one index satisfying a predefined condition for the random value and the recursive vector. The graph generating apparatus may determine the destination vertex based on the determined at least one index. The graph generating apparatus may compare the number of at least one pre-generated edge and the target number of edges, and generate a second edge between the source vertex and a second destination vertex based on a comparison result.

Referring to FIG. 14, in operation 1410, the graph generating apparatus may perform a recursive call in a case in which a random value x is greater than or equal to RecVec[0]; otherwise, may terminate the recursive call according to a stop condition. In operation 1420, the graph generating apparatus may determine an index k corresponding to x in a recursive vector RecVec by performing a binary search. The graph generating apparatus may determine the index k satisfying RecVec[k]≤x<RecVec[k+1].

Since the length of RecVec is very small, RecVec may be loaded on a CPU cache as described above. The graph generating apparatus may calculate a symmetry ratio σ for k in the CPU cache through the binary search without an additional memory access. In operation 1430, the graph generating apparatus may calculate the symmetry ratio $$\sigma = \frac{RecVec[k+1] - RecVec[k]}{RecVec[k]}$$

for k. In operation 1440, the graph generating apparatus may generate a second random value $$x' = \frac{x - RecVec[k]}{\sigma}$$

to be used for a subsequent recursive call. The graph generating apparatus may calculate the symmetry ratio only using the CPU cache without an additional memory access. In operation 1450, the graph generating apparatus may determine a vertex v' corresponding to the random value x' using the recursive vector RecVec. In operation 1460, the graph generating apparatus may return the vertex v corresponding to x as $2^k+v'$. The graph generating apparatus may determine an index k' satisfying RecVec[k']≤x'<RecVec[k'+1], and determine the destination vertex to be $2^k+2^{k'}$ in a case in which there is no index satisfying a predefined condition for the recursive vector and a third random value.

Figure 15:
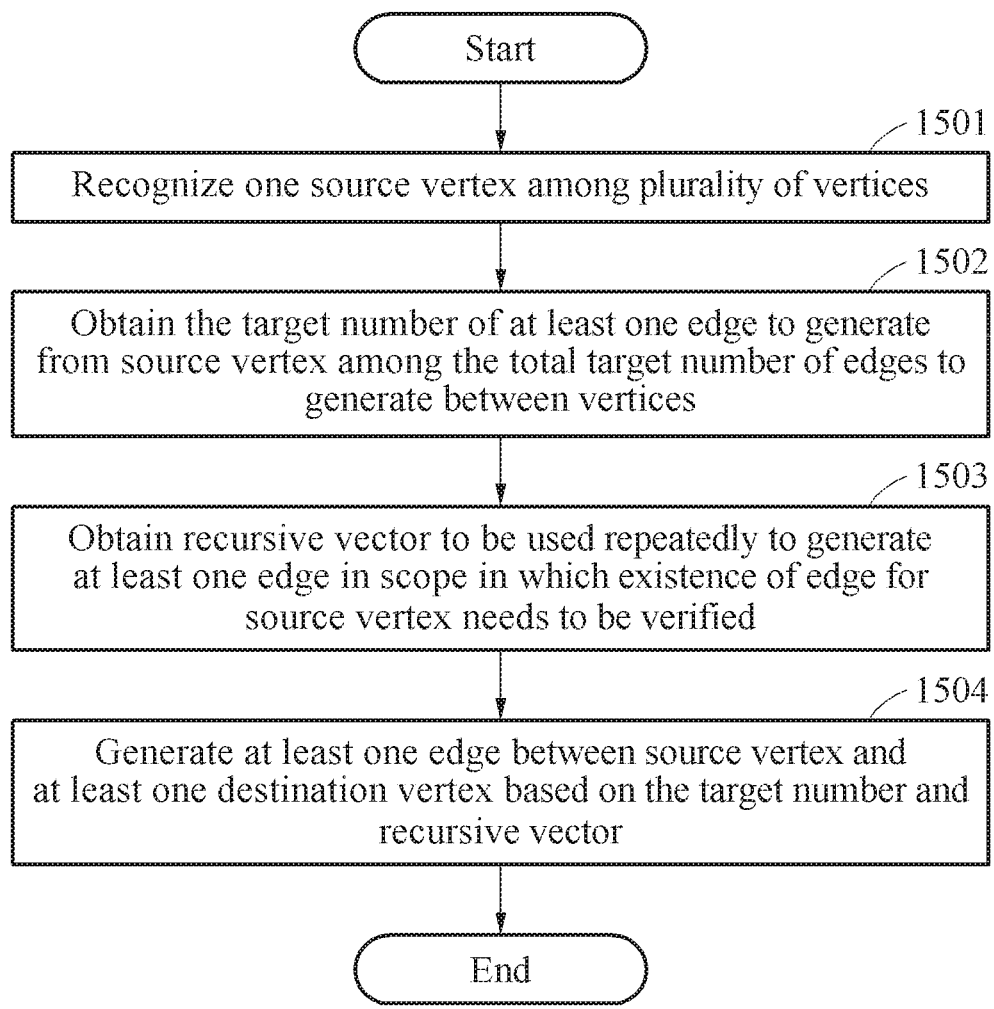
FIG. 15 is a flowchart illustrating a graph generating method according to an embodiment.

FIG. 15 is a flowchart illustrating a graph generating method according to an embodiment.

Referring to FIG. 15, in operation 1501, a graph generating apparatus may recognize one source vertex among a plurality of vertices. In operation 1502, the graph generating apparatus may obtain the target number of at least one edge to generate from the source vertex, among the total target number of edges to generate between the vertices. In operation 1503, the graph generating apparatus may obtain a recursive vector to be used repeatedly to generate the at least one edge, in a scope in which an existence of an edge for the source vertex needs to be verified. In operation 1504, the graph generating apparatus may generate the at least one edge between the source vertex and at least one destination vertex based on the target number and the recursive vector.

Figure 16:
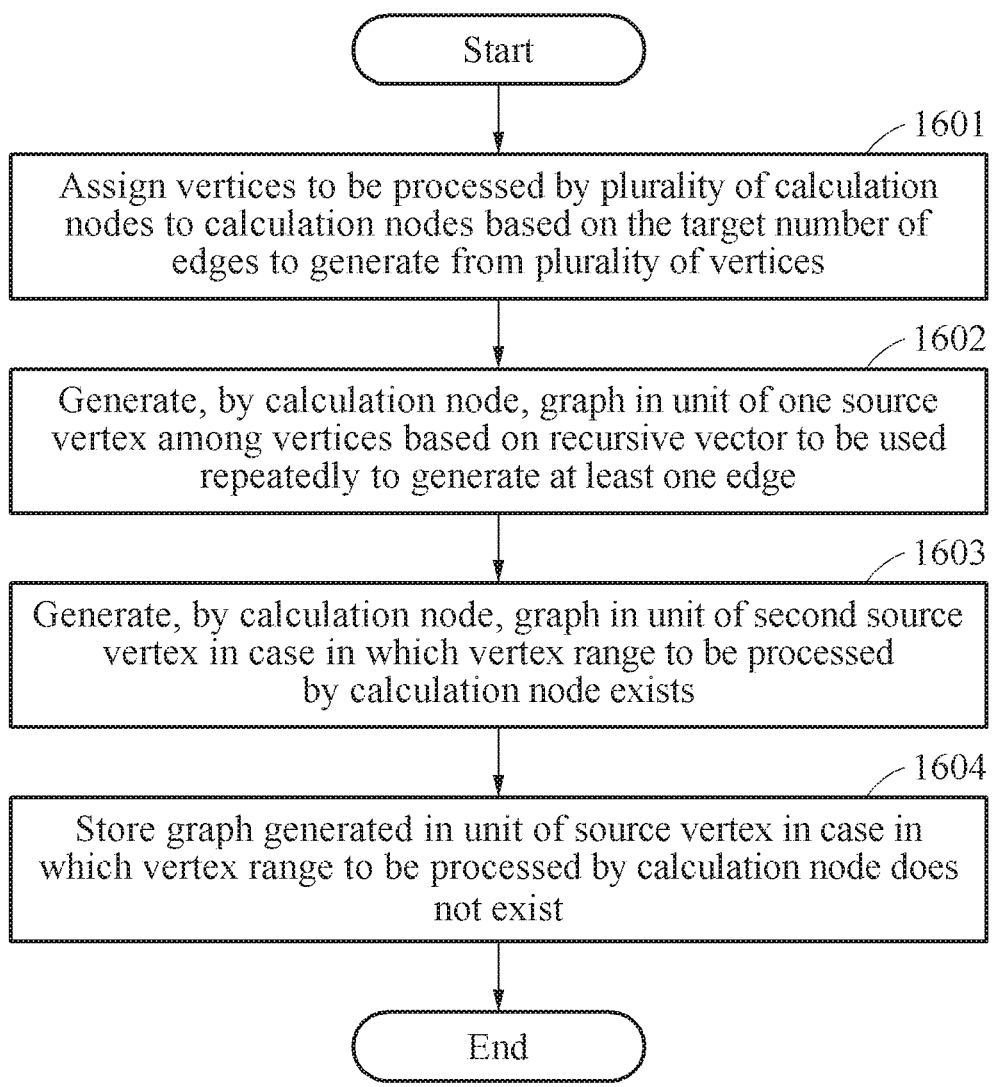
FIG. 16 is a flowchart illustrating a graph generating method according to an embodiment.

FIG. 16 is a flowchart illustrating a graph generating method according to an embodiment.

Referring to FIG. 16, in operation 1601, a graph generating apparatus may assign vertices to be processed by a plurality of calculation nodes to the calculation nodes based on the target numbers of edges to generate from a plurality of vertices. In operation 1602, the graph generating apparatus may generate, by a calculation node, a graph in a unit of one source vertex among the vertices, based on a recursive vector to be used repeatedly to generate at least one edge. The graph generating apparatus may generate the at least one edge between the source vertex and at least one destination vertex in a scope in which an existence of an edge for the source vertex needs to be verified. In operation 1603, the graph generating apparatus may generate, by the calculation node, a graph in a unit of a second source vertex in a case in which a vertex range to be processed by the calculation node exists. In operation 1604, the graph generating apparatus may store the graph generated in the unit of the source vertex in a case in which the vertex range to be processed by the calculation node does not exist. The graph generating apparatus may temporarily store the graph generated in the unit of the source vertex in a buffer of the calculation node, and asynchronously store the graph stored in the buffer to an auxiliary memory of the calculation node. In an example, graphs corresponding to the vertices may be processed in parallel by the calculation nodes for the assigned vertices.

Figure 17:
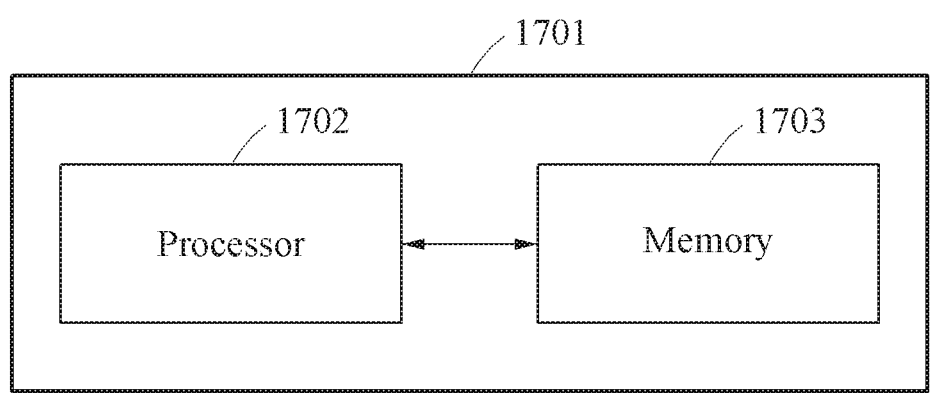
FIG. 17 illustrates an example of a configuration of a graph generating apparatus according to an embodiment.

FIG. 17 illustrates an example of a configuration of a graph generating apparatus according to an embodiment.

Referring to FIG. 17, a graph generating apparatus 1701 may include a processor 1702 and a memory 1703. The processor 1702 may include the at least one apparatus described with reference to FIGS. 1A through 16, or may perform the at least one method described with reference to FIGS. 1A through 16. The memory 1703 may store a program to implement a graph generating method. The memory 1703 may be a volatile memory or a non-volatile memory. The processor 1702 may execute the program, and control the graph generating apparatus 1701. Codes of the program executed by the processor 1702 may be stored in the memory 1703. The graph generating apparatus 1701 may be connected to an external device, for example, a personal computer (PC) or network, through an I/O device (not shown), and exchange data with the external device.

According to an embodiment, a graph generating method may generate a graph efficiently in terms of space and time complexities.

According to an embodiment, a graph generating method may generate massive graphs in a short time only using a small amount of memory.

According to an embodiment, a graph generating method may improve a scalability of graph generation.

The units and/or modules described herein may be implemented using hardware components, software components, and/or combination thereof. For example, the hardware components may include microphones, amplifiers, bandpass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include plurality of processing elements and plurality of types of processing elements. For example, a processing device may include plurality of processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A computer implemented method for reducing computational time and memory consumption of a hardware processor generating graph, comprising:
using at least one hardware processor for:
recognizing one source vertex among a plurality of vertices;
obtaining the target number of at least one edge to generate from the source vertex, among the total target number of edges to generate between the vertices;
obtaining a recursive vector to be used repeatedly to generate the at least one edge, in a scope in which an existence of an edge for the source vertex needs to be verified; and
generating the at least one edge between the source vertex and at least one destination vertex based on the target number and the recursive vector,
wherein the scope is determined based on the number of the vertices.

2. The graph generating method of claim 1, wherein the obtaining of the target number comprises:
calculating a probability of generating an edge connected from the source vertex based on predefined probability parameters; and
determining the target number of at least one edge to generate from the source vertex based on a stochastic distribution following the probability and the total target number.

3. The graph generating method of claim 2, wherein the probability is calculated based on the number of 1 bits in a binary string corresponding to the source vertex and the probability parameters of which the sum is 1.

4. The graph generating method of claim 2, wherein the calculating of the probability comprises calculating the probability of generating an edge connected from the source vertex using $P_{u\rightarrow} = (\alpha+\beta)^{Bits(\sim u)} \cdot (\gamma+\delta)^{Bits(u)}$,
where $P_{u\rightarrow}$ denotes the probability, u denotes the binary string corresponding to the source vertex, ~ denotes a bitwise NOT operator, Bits(x) denotes a local bit operator which returns the number of 1 bits in a binary string x, and $\alpha$, $\beta$, $\gamma$ and $\delta$ denote the probability parameters of which the sum is 1.

5. The graph generating method of claim 2, wherein the determining of the target number comprises generating a random value following a normal distribution N(np, np(1−p)), where n denotes the total target number, and p denotes the probability.

6. The graph generating method of claim 1, wherein the obtaining of the recursive vector comprises:
calculating a probability of generating an edge connected from the source vertex based on predefined probability parameters; and
generating a recursive vector having values of elements corresponding to indices based on the probability, the probability parameters, and the number of the vertices.

7. The graph generating method of claim 6, wherein the generating of the recursive vector comprises generating the values of the elements of the recursive vector for each of indices satisfying a predefined condition, using $$RecVec[x] = \left(\frac{\alpha}{\alpha+\beta}\right)^{log|V|-x-Bits(u \gg x)} \cdot \left(\frac{\gamma}{\gamma+\delta}\right)^{Bits(u \gg x)} \cdot P_{u \to},$$

where x denotes an index, RecVec[x] denotes a value of an element of the recursive vector corresponding to x, $\alpha, \beta, \gamma$ and $\delta$ denote the probability parameters of which the sum is 1, |V| denotes the number of the vertices, >> denotes a logical right shift operator, Bits(u>>x) denotes a logical bit operator which returns the number of 1 bits in a binary string u>>z, and $P_{u \to}$ denotes the probability.

8. The graph generating method of claim 7, wherein the predefined condition is x≤log |V|.

9. The graph generating method of claim 1, wherein the length of the recursive vector is log |V|+1, where |V| denotes the number of the vertices.

10. The graph generating method of claim 1, wherein the recursive vector is stored in a central processing unit (CPU) cache.

11. The graph generating method of claim 1, wherein the generating comprises determining the at least one destination vertex by repeatedly performing a binary search with respect to the recursive vector and generating at least one edge corresponding to the determined destination vertex, until edges corresponding to the target number are generated.

12. The graph generating method of claim 1, wherein the generating comprises:
generating a random value based on the recursive vector and the number of the vertices;
determining a destination vertex corresponding to the random value based on the recursive vector; and
generating an edge between the source vertex and the destination vertex.

13. The graph generating method of claim 12, wherein the generating of the edge further comprises:
comparing the number of at least one pre-generated edge and the target number; and
generating a second edge between the source vertex and a second destination vertex based on a result of the comparing.

14. The graph generating method of claim 12, wherein the generating of the random value comprises generating the random value based on a value of an element of the recursive vector corresponding to the number of the vertices.

15. The graph generating method of claim 14, wherein the random value is a value between 0 and RecVec[log |V|], where |V| denotes the number of the vertices, and RecVec [log |V|] denotes the value of the element of the recursive vector corresponding to log |V|.

16. The graph generating method of claim 12, wherein the determining of the destination vertex comprises:
determining at least one index satisfying a predefined condition for the recursive vector and the random value; and
determining the destination vertex based on the determined at least one index.

17. The graph generating method of claim 12, wherein the determining of the destination vertex comprises:
determining a first index satisfying a predefined condition for the recursive vector and the random value;
calculating a symmetry ratio for the first index based on the first index and the recursive vector;
generating a second random value based on the random value, the recursive vector, and the symmetry ratio;
determining a second index satisfying the predefined condition for the recursive vector and the second random value; and
determining the destination vertex based on at least one pre-generated index, in a case in which there is no index satisfying the predefined condition for the recursive vector and a third random value.

18. The graph generating method of claim 12, wherein the determining of the destination vertex comprises:
determining an index k satisfying RecVec[k]≤x<RecVec [k|1];
calculating a symmetry ratio $$\sigma = \frac{RecVec[k+1] - RecVec[k]}{RecVec[k]}$$

for k;
generating a second random value $$x' = \frac{x - RecVec[k]}{\sigma};$$

determining an index k' satisfying RecVec[k']≤x'<RecVec [k'|; and
determining the destination vertex to be $2^k+2^{k_1}$ in a case in which there is no index satisfying a predetermined condition for the recursive vector and a third random value,
where x denotes the random value, and RecVec[k] denotes a value of an element of the recursive vector corresponding to k.

19. A non-transitory computer-readable storage medium storing instructions that, when executed by a processor, cause the processor to perform the graph generating method of claim 1.

20. A computer implemented method for reducing computational time and memory consumption of at least one hardware processor generating graph, comprising:
assigning, by at least one hardware processor, vertices to be processed by a plurality of calculation nodes to the calculation nodes based on the target numbers of edges to generate from a plurality of vertices;
generating, by a calculation node, a graph in a unit of one source vertex among the vertices, based on a recursive vector to be used repeatedly to generate at least one edge;
generating, by the calculation node, a graph in a unit of a second source vertex in a case in which a vertex range to be processed by the calculation node exists; and storing the graph generated in the unit of the source vertex in a case in which the vertex range to be processed by the calculation node does not exist, wherein the generating of the graph in the unit of the source vertex comprises generating at least one edge between the source vertex and at least one destination vertex in a scope in which an existence of an edge for the source vertex needs to be verified.

21. The graph generating method of claim 20, wherein the assigning comprises:

determining the target numbers of the vertices based on predefined probability parameters and the total target number of edges to generate between the vertices;

partitioning the vertices for the calculation nodes based on the total target number and the number of the calculation nodes, and generating vertex ranges by combining the partitioned vertices;

repartitioning the generated vertex ranges for the calculation nodes based on the total target number and the number of the calculation nodes; and assigning the vertices to be processed by the calculation nodes to the calculation nodes based on the vertex ranges repartitioned for the calculation nodes.

22. The graph generating method of claim 20, wherein graphs corresponding to the vertices are processed in parallel by the calculation nodes for the assigned vertices.

23. The graph generating method of claim 20, wherein the recursive vector is stored in a central processing unit (CPU) cache of the calculation node.

24. The graph generating method of claim 20, further comprising:

temporarily storing the graph generated in the unit of the source vertex in a buffer of the calculation node; and asynchronously storing the graph stored in the buffer to an auxiliary memory of the calculation node based on an amount of data stored in the buffer.

25. An apparatus for reduced computational time and memory consumption of a hardware processor generating graph, comprising:

a processor configured to:

recognize one source vertex among a plurality of vertices, obtain the target number of at least one edge to generate from the source vertex, among the total target number of edges to generate between the vertices, obtain a recursive vector to be used repeatedly to generate the at least one edge, in a scope in which an existence of an edge for the source vertex needs to be verified, and generate the at least one edge between the source vertex and at least one destination vertex based on the target number and the recursive vector, wherein the scope is determined based on the number of the vertices.

26. An apparatus for reduced computational time and memory consumption of a hardware processor generating graph, comprising:

a controller configured to assign vertices to be processed by a plurality of calculation nodes to the calculation nodes based on the target numbers of edges to generate from a plurality of vertices; and a calculation node configured to:

generate a graph in a unit of one source vertex among the vertices, based on a recursive vector to be used repeatedly to generate at least one edge, generate a graph in a unit of a second source vertex in a case in which a vertex range to be processed exists, and store the graph generated in the unit of the source vertex in a case in which the vertex range to be processed does not exist, wherein the calculation node generate at least one edge between the source vertex and at least one destination vertex in a scope in which an existence of an edge for the source vertex needs to be verified.

* * * * *